US012563316B2

(12) United States Patent
Adler et al.

(10) Patent No.: US 12,563,316 B2
(45) Date of Patent: Feb. 24, 2026

(54) MULTI-MODALITY WITH TDI SENSOR

(71) Applicant: Orbotech Ltd., Yavne (IL)

(72) Inventors: Avraham Adler, Nof Ayalon (IL); Avihay Ankry, Rehovot (IL); Mikhael Matusovsky, Rishon Lezion (IL)

(73) Assignee: Orbotech Ltd., Yavne (IL)

( * ) Notice: Subject to any disclaimer, the term of this patent is extended or adjusted under 35 U.S.C. 154(b) by 0 days.

(21) Appl. No.: 18/915,931

(22) Filed: Oct. 15, 2024

(65) Prior Publication Data

US 2026/0046533 A1 Feb. 12, 2026

Related U.S. Application Data

(60) Provisional application No. 63/681,279, filed on Aug. 9, 2024.

(51) Int. Cl.
| | |
|---|---|
| *H04N 25/768* | (2023.01) |
| *G01N 21/95* | (2006.01) |
| *H04N 23/56* | (2023.01) |
| *H04N 25/42* | (2023.01) |
| *H04N 25/713* | (2023.01) |

(52) U.S. Cl.
CPC ........... *H04N 25/768* (2023.01); *H04N 23/56* (2023.01); *H04N 25/42* (2023.01); *H04N 25/713* (2023.01); *G01N 21/9501* (2013.01)

(58) Field of Classification Search
CPC ...... H04N 25/768; H04N 23/56; H04N 25/42; H04N 25/713; G01N 21/9501
See application file for complete search history.

(56) References Cited

U.S. PATENT DOCUMENTS

| | | | |
|---|---|---|---|
| 7,609,309 B2 | 10/2009 | Brown et al. | |
| 9,402,042 B2 | 7/2016 | Parker et al. | |
| 9,494,531 B2 | 11/2016 | Chuang et al. | |
| 9,826,184 B2 | 11/2017 | Rosmeulen | |
| 10,178,334 B2 | 1/2019 | Zapor et al. | |
| 10,764,527 B2 | 9/2020 | Chuang et al. | |
| 11,463,639 B2 * | 10/2022 | Botts .................... | H04N 25/713 |
| 2007/0146693 A1 | 6/2007 | Brown et al. | |
| 2010/0260409 A1 * | 10/2010 | Ben-Levy ............... | G06T 7/521 |
| | | | 382/141 |
| 2014/0158864 A1 | 6/2014 | Brown et al. | |

(Continued)

FOREIGN PATENT DOCUMENTS

| | | |
|---|---|---|
| CN | 116297524 A | 6/2023 |

*Primary Examiner* — Michael E Teitelbaum
(74) *Attorney, Agent, or Firm* — Suiter Swantz IP

(57) ABSTRACT

A TDI sensor may be a multi-mode TDI sensor. The multi-mode TDI sensor may include active pixel rows, inactive pixel rows, and a readout circuit. The active pixel rows and the inactive pixel rows may alternate in a sequence defining the number of modes for which the multi-mode TDI sensor is configured. The length to which the sample light is scanned before switching between the optical modes is based on a pixel length divided by the number of optical modes to synchronize the active and inactive rows with the optical modes. The active pixel rows may accumulate charge in response to receiving light. The charge may be transferred between the active pixel rows and the inactive pixel rows. The inactive pixel rows may buffer the charge before transferring the charge back to the active pixel rows for further accumulation. The readout circuit may readout the charge.

20 Claims, 19 Drawing Sheets

<u>400</u>

(56)     References Cited

U.S. PATENT DOCUMENTS

| 2016/0295149 | A1 | | 10/2016 | Prabala |
| 2017/0299852 | A1 | * | 10/2017 | Boamfa ............. G01N 21/6456 |
| 2021/0335869 | A1 | * | 10/2021 | Kim .................... H04N 25/671 |
| 2023/0314336 | A1 | | 10/2023 | Virk et al. |
| 2023/0351553 | A1 | | 11/2023 | Sezginer et al. |

* cited by examiner

103

105

201

208 206 204 202

105

201

208

206

204

202

400

410— SEQUENTIALLY RECEIVING SAMPLE LIGHT WITH MULTIPLE OPTICAL MODES

420— ACCUMULATING AND TRANSFERRING CHARGE BETWEEN ACTIVE PIXEL ROWS INACTIVE PIXEL ROWS

430— READING OUT CHARGE

100

READOUT

MULTI-MODALITY WITH TDI SENSOR

CROSS-REFERENCE TO RELATED APPLICATIONS

The present application claims the benefit under 35 U.S.C. § 119 (e) of U.S. Provisional Application Ser. No. 63/681,279, filed Aug. 9, 2024, titled "MULTI-MODALITY WITH TDI SENSOR", which is incorporated herein by reference in the entirety.

TECHNICAL FIELD

The present disclosure generally relates to defect inspection and, more particularly, to defect inspection using multiple optical modes.

BACKGROUND

Inspection systems are typically used in semiconductor fabrication processes to identify defects of the fabrication process that may result in performance degradation or failure of a fabricated device. As fabricated feature sizes continue to shrink, the sizes of fabrication defects also shrink. This results in weaker measurable signals associated with such defects and lower signal to noise ratios (SNRs) during defect inspection. Therefore, it would be advantageous to provide a device, system, and method that cures the shortcomings described above.

SUMMARY

A multi-mode TDI sensor is described, in accordance with one or more embodiments of the present disclosure. The multi-mode TDI sensor may include: a plurality of active pixel rows, wherein the plurality of active pixel rows are configured to accumulate charge based on sample light received by the plurality of active pixel rows; a plurality of inactive pixel rows, wherein the plurality of inactive pixel rows are configured to buffer the charge without accumulating additional of the charge in response to receiving the sample light, wherein the plurality of active pixel rows and the plurality of inactive pixel rows alternate in a sequence, wherein the sequence defines a plurality of optical modes for which the multi-mode TDI sensor is configured, wherein the charge is configured to transfer between the plurality of active pixel rows and the plurality of inactive pixel rows in the sequence; and a readout circuit, wherein the readout circuit is configured to readout the charge as separate images for each of the plurality of optical modes.

In some aspects, the multi-mode TDI sensor is configured for at least two optical modes.

In some aspects, the sequence is one of the plurality of active pixel rows followed by an integer number of the plurality of inactive pixel rows, where the integer number is the plurality of optical modes for which the multi-mode TDI sensor is configured minus one.

In some aspects, the multi-mode TDI sensor is a two-mode TDI sensor configured for two optical modes, wherein the sequence is one of the plurality of active pixel rows followed by one of the plurality of inactive pixel rows.

In some aspects, the multi-mode TDI sensor is a three-mode TDI sensor configured for three optical modes, wherein the sequence is one of the plurality of active pixel rows followed by two of the plurality of inactive pixel rows.

In some aspects, a last of the plurality of inactive pixel rows is configured to transfer the charge to the readout circuit.

In some aspects, the separate images are readout as lines which alternate between the plurality of optical modes according to the sequence.

In some aspects, the plurality of active pixel rows each include a row of a plurality of active pixels, wherein the plurality of inactive pixel rows each include a row of a plurality of inactive pixels.

In some aspects, the sample light includes a spectrum of at least one of one of an ultraviolet wavelength, a visible wavelength, or an infrared wavelength.

In some aspects, the plurality of inactive pixels include a photodiode and an optical filter, wherein the optical filter makes inactive the plurality of inactive pixels.

In some aspects, the optical filter is an intermediate layer within the plurality of inactive pixels.

In some aspects, the optical filter is a mask formed over a top of the plurality of inactive pixels.

In some aspects, the optical filter is configured to filter the spectrum of the sample light.

In some aspects, the optical filter is configured to filter each wavelength for which the photodiode is configured to accumulate the charge.

In some aspects, the plurality of active pixels and the plurality of inactive pixels include a photodiode, wherein the photodiode of the plurality of inactive pixels is configured to accumulate the charge within the spectrum, wherein the photodiode of the plurality of inactive pixels is not configured to accumulate the charge within the spectrum.

In some aspects, the sample light is visible light.

In some aspects, the readout circuit is configured to generate a plurality of lines of the separate images, wherein the plurality of lines alternate in the sequence of the plurality of optical modes.

An optical inspection system is described, in accordance with one or more embodiments of the present disclosure. The optical inspection system may include: at least one illumination source configured to generate illumination; a multi-mode TDI sensor including: a plurality of active pixel rows, wherein the plurality of active pixel rows are configured to accumulate charge based on sample light received by the plurality of active pixel rows, wherein the sample light emanates from a sample in response to the illumination; a plurality of inactive pixel rows, wherein the plurality of inactive pixel rows are configured to buffer the charge without accumulating additional of the charge in response to receiving the sample light, wherein the plurality of active pixel rows and the plurality of inactive pixel rows alternate in a sequence, wherein the sequence defines a plurality of optical modes for which the multi-mode TDI sensor is configured, wherein the charge is configured to transfer between the plurality of active pixel rows and the plurality of inactive pixel rows in the sequence; and a readout circuit, wherein the readout circuit is configured to readout the charge as separate images for each of the plurality of optical modes, wherein the optical inspection system is configured to generate the separate images by scanning the sample with the illumination; and a controller, wherein the controller is configured to control a length to which the sample light is scanned before switching between the plurality of optical modes, wherein the length to which the sample light is scanned before switching between the plurality of optical modes is based on a pixel length divided by the plurality of optical modes.

In some aspects, the controller is configured to: cause the multi-mode TDI sensor to sequentially receive the sample light with the plurality of optical modes; accumulate the charge in the plurality of active pixel rows and transfer the charge between the plurality of active pixel rows and the plurality of inactive pixel rows of the multi-mode TDI sensor as the sample light is sequentially received; and readout the charge via the readout circuit.

A method is described, in accordance with one or more embodiments of the present disclosure. The method may include: causing a multi-mode TDI sensor to sequentially receive a sample light with a plurality of optical modes, wherein the multi-mode TDI sensor includes a plurality of active pixel rows, wherein the plurality of active pixel rows are configured to accumulate charge based on the sample light received by the plurality of active pixel rows; a plurality of inactive pixel rows, wherein the plurality of inactive pixel rows are configured to buffer the charge without accumulating additional of the charge in response to receiving the sample light, wherein the plurality of active pixel rows and the plurality of inactive pixel rows alternate in a sequence, wherein the sequence defines the plurality of optical modes for which the multi-mode TDI sensor is configured, wherein the charge is configured to transfer between the plurality of active pixel rows and the plurality of inactive pixel rows in the sequence; and a readout circuit, wherein the readout circuit is configured to readout the charge as separate images for each of the plurality of optical modes; accumulating the charge in the plurality of active pixel rows and transferring the charge between the plurality of active pixel rows and the plurality of inactive pixel rows of the multi-mode TDI sensor as the sample light is sequentially received, wherein a length to which the sample light is scanned before switching between the plurality of optical modes is based on a pixel length divided by the plurality of optical modes; and reading out the charge via the readout circuit.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the description and drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Time delay integration (TDI) sensors may be used in optical inspection system, especially, when the scanning application has issues with low light exposure on the sensor. One disadvantage of previous TDI sensors is that multi-modalities may not be used in a single sensor.

Embodiments of the present disclosure are directed to a multi-mode TDI sensor. The multi-mode TDI sensor may include active pixel rows, inactive pixel rows, and a readout circuit. The active pixel rows and the inactive pixel rows may alternate in a sequence defining the number of modes for which the multi-mode TDI sensor is configured. The length to which the sample light is scanned before switching between the optical modes is based on a pixel length divided by the number of optical modes to synchronize the active and inactive rows with the optical modes. The active pixel rows may accumulate charge in response to receiving light. The charge may be transferred between the active pixel rows and the inactive pixel rows. The inactive pixel rows may not accumulate additional of the charge when exposed to sample light. Instead, the inactive pixel rows may buffer the charge before transferring the charge back to the active pixel rows for further accumulation. The readout circuit may readout the charge.

U.S. Patent Publication Number US20230351553A1, titled "Shot noise reduction using frame averaging"; U.S. Patent Publication Number US20230314336A1, titled "Multi-mode optical inspection"; U.S. Patent Number U.S. Pat. No. 10,764,527B2, titled "Dual-column-parallel CCD sensor and inspection systems using a sensor"; U.S. Patent Publication Number US20160295149A1, titled "Simultaneous multi-channel tdi imaging on a multi-tap imager"; U.S. Patent Number U.S. Pat. No. 9,402,042B2, titled "Time delay and integration scanning using a CCD imager"; U.S. Patent Number U.S. Pat. No. 7,609,309B2, titled "Continuous clocking of TDI sensors"; are each incorporated herein by reference in the entirety.

Figure 1A:
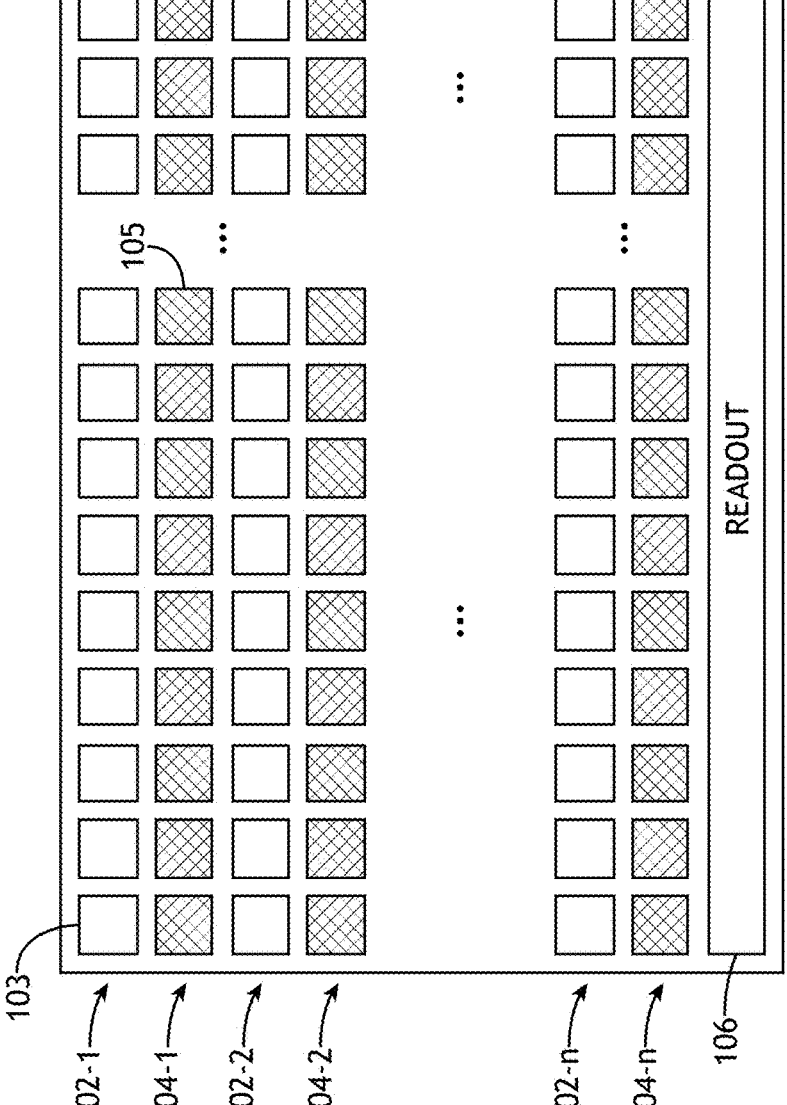
FIG. 1A depicts a top view of a multi-mode TDI sensor configured for two modes, in accordance with one or more embodiments of the present disclosure.
Figure 1B:
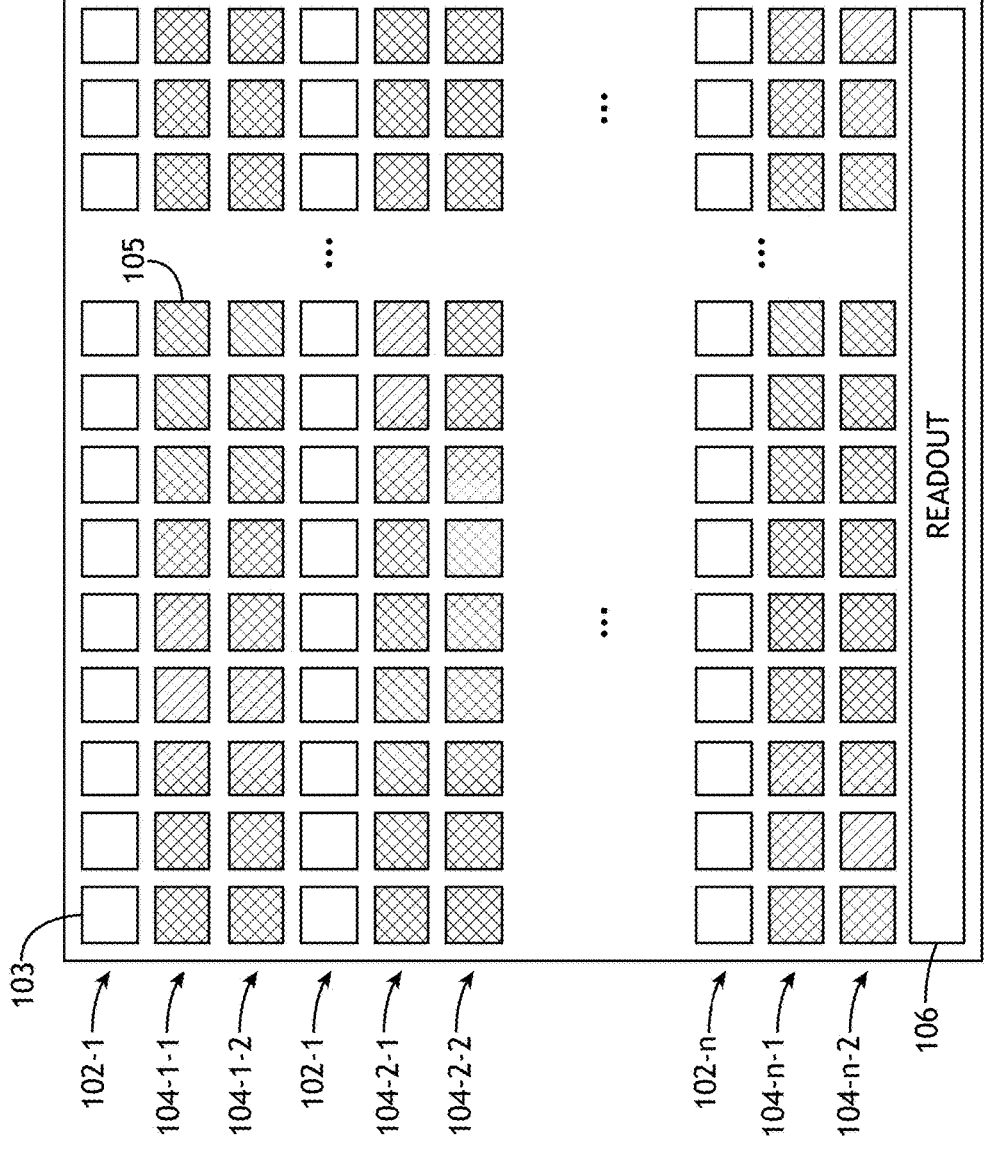
FIG. 1B depicts a top view of the multi-mode TDI sensor configured for three modes, in accordance with one or more embodiments of the present disclosure.

FIGS. 1A-1B depict a multi-mode TDI sensor 100, in accordance with one or more embodiments of the present disclosure. The multi-mode TDI sensor 100 may be configured to generate images from sample light at multiple modes. The multi-mode TDI sensor 100 may be configured to simultaneously generate the images from sample light at the multiple optical modes. Simultaneously generating the images may be advantageous to remove registration errors between the images.

The multi-mode TDI sensor 100 may be a two-mode TDI sensor, a three-mode TDI sensor, or more. The multi-mode TDI sensor 100 may be configured for at least two optical modes. For example, the multi-mode TDI sensor 100 may be configured for two optical modes, three optical modes, or more.

The multi-mode TDI sensor 100 may be a charge-coupled device (CCD). The multi-mode TDI sensor 100 may include active pixel rows 102, inactive pixel rows 104, and a readout circuit 106.

The active pixel rows 102 may be configured to accumulate a charge based on sample light received by the active pixel rows 102. The active pixel rows 102 may each include a row of active pixels 103. The active pixels 103 may be referred to as photosensitive pixels. The active pixels 103 may receive the sample light and accumulate the charge based on the sample light received.

The inactive pixel rows 104 may buffer the charge without accumulating additional of the charge in response to receiving the sample light. Buffering the charge without accumulating may refer to accumulating the charge from the previous row without adding more charge. The inactive pixel rows 104 may not accumulate additional of the charge even where sample light is received by the inactive pixel rows 104. Thus, the sample light may not be integrated into the charge when the charge is buffered in the inactive pixel rows 104. The inactive pixel rows 104 may each include a row of inactive pixels 105. The inactive pixels 105 may be referred to as non-photosensitive pixels or buffer pixels.

The active pixels 103 and/or the inactive pixels 105 may include a select shape. The shape of the active pixels 103 and/or the inactive pixels 105 may be a rectangle (e.g., a square or an oblong rectangle) or another geometric shape. As depicted, the shape of the active pixels 103 and the inactive pixels 105 is square, although this is not intended to be limiting.

The active pixel rows 102 and the inactive pixel rows 104 may be arranged in a two-dimensional array with columns of the active pixel rows 102 and the inactive pixel rows 104. The number of the columns may define the number of the active pixels 103 in the active pixel rows 102 and/or the number of the inactive pixels 105 in the inactive pixel rows 104. The active pixel rows 102 and/or the inactive pixel rows 104 may include any number of the active pixels 103 and the inactive pixels 105, respectively. For example, the active pixel rows 102 and/or the inactive pixel rows 104 may include between 32 and 128, or more, of the active pixels 103 and the inactive pixels 105, respectively. Each of the active pixel rows 102 and/or the inactive pixel rows 104 may include a matching number of the active pixels 103 and the inactive pixels 105, respectively.

The active pixel rows 102 and the inactive pixel rows 104 may alternate in a sequence. The sequence may define the number of optical modes for which the multi-mode TDI sensor 100 is configured. The active pixel rows 102 and the inactive pixel rows 104 may repeat in the sequence. Each of the columns may follow the sequence. The sequence may follow the form of one of the active pixel rows 102 followed by an integer number of the inactive pixel rows 104, where the integer number of the inactive pixel rows 104 is the number of optical modes of the multi-mode TDI sensor 100 minus one. For example, the multi-mode TDI sensor 100 may include a sequence of one of the active pixel rows 102 followed by one of the inactive pixel rows 104, where the multi-mode TDI sensor 100 is a two-mode TDI sensor configured for two optical modes. In this example, every other row of the two-mode TDI sensor may be the active pixel rows 102. By way of another example, the multi-mode TDI sensor 100 may include a sequence of one of the active pixel rows 102 followed by two of the inactive pixel rows 104, where the multi-mode TDI sensor 100 is a three-mode TDI sensor configured for three optical modes. In this example, every third row of the three-mode TDI sensor may be the active pixel rows 102.

The multi-mode TDI sensor 100 may include any number of the active pixel rows 102 and/or the inactive pixel rows 104. For example, the multi-mode TDI sensor 100 may include between 16 and 64, or more, of the active pixel rows 102 and/or the inactive pixel rows 104.

The number of the inactive pixel rows 104 in the multi-mode TDI sensor 100 may be based on the number of the active pixel rows 102. The number of the inactive pixel rows 104 may be the number of the active pixel rows 102 times the quantity of the number of optical modes of the multi-mode TDI sensor 100 minus one. For example, the number of the inactive pixel rows 104 may match the number of the active pixel rows 102 where the multi-mode TDI sensor 100 is a two-mode TDI sensor. By way of another example, the number of the inactive pixel rows 104 may be twice the number of the active pixel rows 102 where the multi-mode TDI sensor 100 is a three-mode TDI sensor.

The charge may transfer between the active pixel rows 102 and the inactive pixel rows 104. The charge may transfer in the sequence between the active pixel rows 102 and the inactive pixel rows 104. The charge may transfer between the active pixel rows 102 and the inactive pixel rows 104 along the columns defined by the active pixel rows 102 and the inactive pixel rows 104. The charge may not transfer along the rows.

The charge may continually be accumulated in the active pixel rows 102 and buffered in the inactive pixel rows 104 while being transferred between the active pixel rows 102 and the inactive pixel rows 104. The active pixel rows 102 may accumulate the charge from sample light. Charge integration may occur over the active pixel rows 102. The active pixel rows 102 may transfer the charge to the inactive pixel rows 104. The inactive pixel rows 104 may receive the charge from the active pixel rows 102. The inactive pixel rows 104 may act as a buffer for the active pixel rows 102. The inactive pixel rows 104 may not accumulate additional of the charge from the sample light. Thus, the charge received by the inactive pixel rows 104 from the active pixel rows 102 may be maintained constant within the inactive pixel rows 104. The inactive pixel rows 104 may transfer the charge to the active pixel rows 102 and/or the inactive pixel rows 104. The active pixel rows 102 may then accumulate additional of the charge from the sample light. The additional of the charge may be accumulated to improve the signal-to-noise ratio of the charge. The charge may continually be accumulated in the active pixel rows 102 and buffered in the inactive pixel rows 104 while being transferred between the active pixel rows 102 and the inactive pixel rows 104 up to a last of the inactive pixel rows 104 of the multi-mode TDI sensor 100. The last of the inactive pixel rows 104 may then transfer the charge to the readout circuit 106. Although the last of the inactive pixel rows 104 are described as transferring the charge to the readout circuit 106, this is not intended as a limitation of the present disclosure. It is contemplated, that the last of the active pixel rows 102 may transfer the charge to the readout circuit 106, such that the last of the inactive pixel rows 104 may not be required.

The readout circuit 106 may receive the charge. The readout circuit 106 may receive the charge from the last of the inactive pixel rows 104 of the multi-mode TDI sensor 100. The readout circuit 106 may readout the charge as images. The readout circuit 106 may readout the charge as separate images for each of the optical modes. The separate images may be readout as lines which alternate between the optical modes according to the sequence of the active pixel rows 102 and the inactive pixel rows 104. The readout circuit 106 may also buffer the lines according to the mode at which the lines are generated, thereby forming images.

The readout circuit 106 may include various components for reading out the charge, such as, but not limited to, serial registers, amplifiers, transfer gates, analog-to-digital converters, and the like. The components of the readout circuit 106 may configure the readout circuit 106 to perform the various functions (e.g., readout the charge as the lines of the image).

Increasing the number of the inactive pixel rows 104 while maintaining the total number of rows in the multi-mode TDI sensor 100 may increase the number of modes for which the multi-mode TDI sensor 100 at the expense of decreasing the signal-to-noise ratio of the images generated. An example is provided comparing a two-mode TDI sensor with a four-mode TDI sensor which each have a total of 128 rows. The two-mode TDI sensor may include 64 of the active pixel rows 102 and 64 of the inactive pixel rows 104. The four-mode TDI sensor may include 32 of the active pixel rows 102 and 96 of the inactive pixel rows 104. A total time in which the 32 of the active pixel rows 102 of the four-mode TDI sensor collects the charge is half of the total time in which the 64 of the active pixel rows 102 of the two-mode TDI sensor collects the charge. Thus, the signal-to-noise ratio generated from the charge of the four-mode TDI sensor may be half of the signal-to-noise ratio generated from the charge of the two-mode TDI sensor.

FIG. 1A depicts an example of the multi-mode TDI sensor 100 as a two-mode TDI sensor with the active pixel rows 102 (e.g., first active pixel row 102-1, second active pixel row 102-2, last active pixel row 102-n) and the inactive pixel rows 104 (e.g., first inactive pixel row 104-1, second inactive pixel row 104-2, last inactive pixel row 104-n).

FIG. 1B depicts an example of the multi-mode TDI sensor 100 as a three-mode TDI sensor with the active pixel rows 102 (e.g., first active pixel row 102-1, second active pixel row 102-2, last active pixel row 102-n) and the inactive pixel rows 104 (e.g., first-pair first inactive pixel row 104-1-1, second-pair first inactive pixel row 104-1-2, first-pair second inactive pixel row 104-2-1, second-pair second inactive pixel row 104-2-2, first-pair last inactive pixel row 104-n-1, second-pair last inactive pixel row 104-n-2).

Figure 2A:
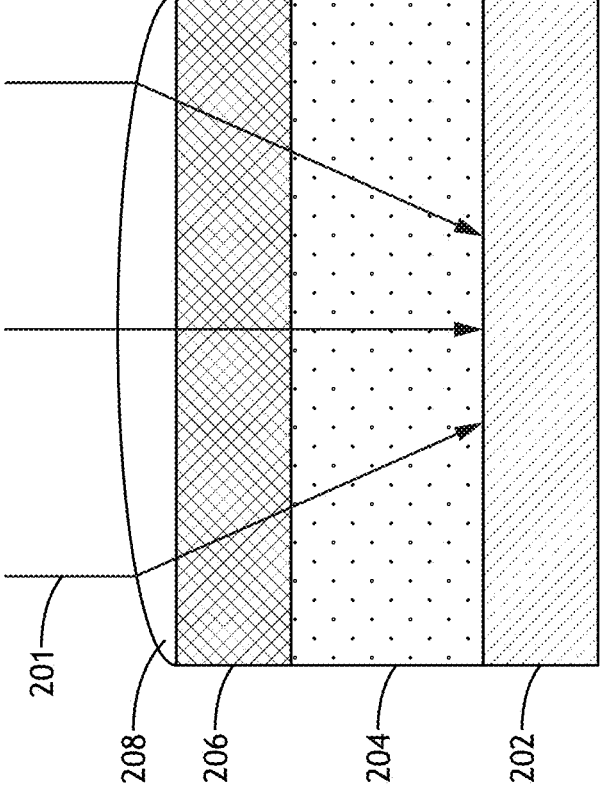
FIG. 2A depicts a simplified cross-section view of an active pixel of the multi-mode TDI sensor, in accordance with one or more embodiments of the present disclosure.

FIG. 2A depicts the active pixels 103, in accordance with one or more embodiments of the present disclosure. The active pixels 103 may include a photodiode 202, an interconnect layer 204, an optical filter 206, and/or a microlens 208.

The photodiode 202 may be disposed below the optical filter 206, and/or the microlens 208. The photodiode 202 may abut to the interconnect layer 204. The interconnect layer 204 may be disposed above the photodiode 202. The interconnect layer 204 may be disposed below the optical filter 206, and/or the microlens 208. The interconnect layer 204 may abut between the photodiode 202 and/or the optical filter 206. The optical filter 206 may be an intermediate layer within the inactive pixels 105. The optical filter 206 may be disposed above the photodiode 202 and/or the interconnect layer 204. The optical filter 206 may be disposed below the microlens 208. The optical filter 206 may abut between the interconnect layer 204 and/or the microlens 208. The microlens 208 may be disposed above the photodiode 202, the interconnect layer 204, and/or the optical filter 206. The microlens 208 may abut to the optical filter 206.

The sample light 201 may have any spectrum such as, but not limited to, ultraviolet (UV) wavelengths, visible wavelengths, or infrared (IR) wavelengths. Further, the sample light 201 may be a broadband source, a narrowband source, and/or a tunable source.

The active pixels 103 may be configured to receive the sample light 201. The sample light 201 may be configured to pass through the microlens 208, the optical filter 206, and/or the interconnect layer 204 to the photodiode 202. The microlens 208 may focus the sample light 201 onto the photodiode 202.

The optical filter 206 may filter one or more wavelengths from the sample light 201. The optical filter 206 of the active pixels 103 may not filter each of the wavelengths of the sample light 201 for which the photodiode 202 is configured to accumulate charge. Thus, at least a portion of the wavelengths of the sample light 201 for which the photodiode 202 are configured to accumulate charge may pass through the optical filter 206.

The active pixels 103 may accumulate the charge in the photodiode 202. For example, the active pixels 103 may receive the sample light 201 and accumulate the charge. The photodiode 202 may include a p-n junction. The photodiode 202 may accumulate the charge via electron-hole pairs formed by the p-n junction in response to receiving the sample light 201. The p-n junction may include any suitable p-n junction. For example, the p-n junction may be formed by a p-type substrate and an n-type channel formed in the p-type substrate. By way of another example, the p-n junction may be formed by an n-type substrate and a p-type channel formed in the n-type substrate.

The photodiode 202 may be made of a select material. For example, the photodiode 202 may be made of silicon, germanium, indium gallium arsenide, Lead (II) sulfide, or the like. The material may be doped with the p-n junction.

The photodiode 202 may accumulate the charge in a select band of the sample light 201. The photodiode 202 may accumulate the charge within the spectrum of the sample light. For example, the photodiode 202 may accumulate the charge in one or more portions of the infrared spectrum, the visible spectrum, and/or the ultraviolet spectrum. The band to which the photodiode 202 accumulates charge may be based on a material from which the photodiode 202 is made. For example, the silicon photodiode may accumulate charge for the sample light 201 with a wavelength between 190 to 1100 nm. By way of another example, the germanium photodiode may accumulate charge for the sample light 201 with a wavelength between 400 and 1700 nm.

Figure 2B:
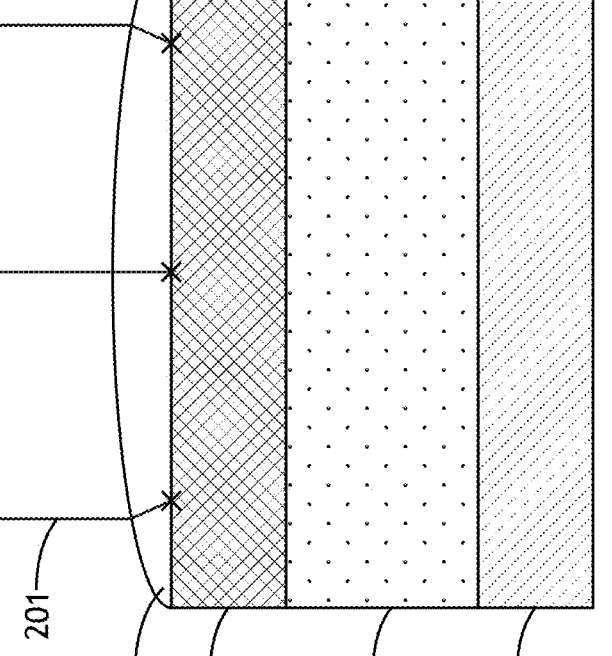
FIGS. 2B-2D depict simplified cross-section views of an inactive pixel of the multi-mode TDI sensor, in accordance with one or more embodiments of the present disclosure.

FIG. 2B depicts the inactive pixels 105, in accordance with one or more embodiments of the present disclosure. The inactive pixels 105 may include the photodiode 202, the interconnect layer 204, the optical filter 206, and/or the microlens 208.

The inactive pixels 105 may be configured to receive the sample light 201. The sample light 201 may be configured to pass through the microlens 208 to the optical filter 206. The optical filter 206 may prevent the sample light 201 from passing through the optical filter 206. For example, the optical filter 206 may filter the spectrum of the sample light 201. Alternatively or additionally, the optical filter 206 may filter each of the wavelengths of the sample light 201 for which the photodiode 202 is configured to accumulate charge. For example, the optical filter 206 may be configured to filter the sample light 201 with a wavelength between 190 to 1100 nm where the photodiode 202 is silicon, filter the sample light 201 with a wavelength between 400 and 1700 nm where the photodiode 202 is a germanium photodiode, or the like. The optical filter 206 may be an opaque filter where the optical filter 206 filters each of the wavelengths of the sample light 201 for which the photodiode 202 is configured to accumulate charge. Thus, the optical filter 206 may make inactive the inactive pixels 105.

The charge may be transferred between the photodiodes 202 of the active pixels 103 and the inactive pixels 105. For example, the interconnect layer 204 of the active pixels 103 and the inactive pixels 105 may transfer the charge between the photodiodes 202 of the active pixels 103 and the inactive pixels 105. The photodiodes 202 of the inactive pixels 105 may store the charge without accumulating additional of the charge.

Figure 2C:
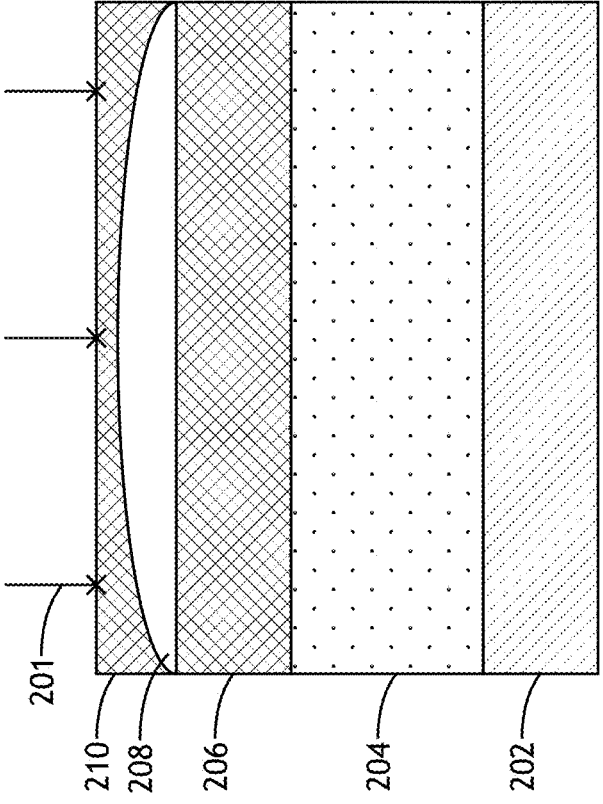

FIG. 2C depicts the inactive pixels 105, in accordance with one or more embodiments of the present disclosure. Although the optical filter 206 is described as making inactive the inactive pixels 105, this is not intended as a limitation of the present disclosure. The optical filter 206 may or may not be configured to filter the spectrum of the sample light 201 and/or filter the wavelengths of the sample light 201 for which the photodiode 202 is configured to accumulate charge. For example, the optical filter 206 of the inactive pixels 105 may be the same as the optical filter 206 of the active pixels 103.

The inactive pixels 105 may also include an optical filter 210. The optical filter 210 may be a mask formed over a top of the inactive pixels 105. The optical filter 210 may be disposed above the photodiode 202, the interconnect layer 204, the optical filter 206, and/or the microlens 208. The optical filter 210 may abut to the microlens 208. The optical filter 210 may be formed over the microlens 208.

The optical filter 210 may receive the sample light 201. The optical filter 210 prevent the sample light 201 from passing through the optical filter 210 to the microlens 208. For example, the optical filter 210 may filter the spectrum of the sample light 201. Alternatively or additionally, the optical filter 210 may filter each of the wavelengths of the sample light 201 for which the photodiode 202 is configured to accumulate charge. For example, the optical filter 210 may be configured to filter the sample light 201 with a wavelength between 190 to 1100 nm where the photodiode 202 is silicon, filter the sample light 201 with a wavelength between 400 and 1700 nm where the photodiode 202 is a germanium photodiode, or the like. Thus, the optical filter 210 may make inactive the inactive pixels 105.

The configuration of the inactive pixels 105 with the optical filter 210 may be beneficial in that the active pixels 103 and the inactive pixels 105 may be manufactured with the same of the photodiode 202, the interconnect layer 204, the optical filter 206, and/or the microlens 208 in a first manufacturing step and then the inactive pixels 105 may be manufactured with the optical filter 210 over the microlens 208 in a second manufacturing step. For example, the optical filter 210 may be formed as a mask without masking the active pixels 103.

Figure 2D:
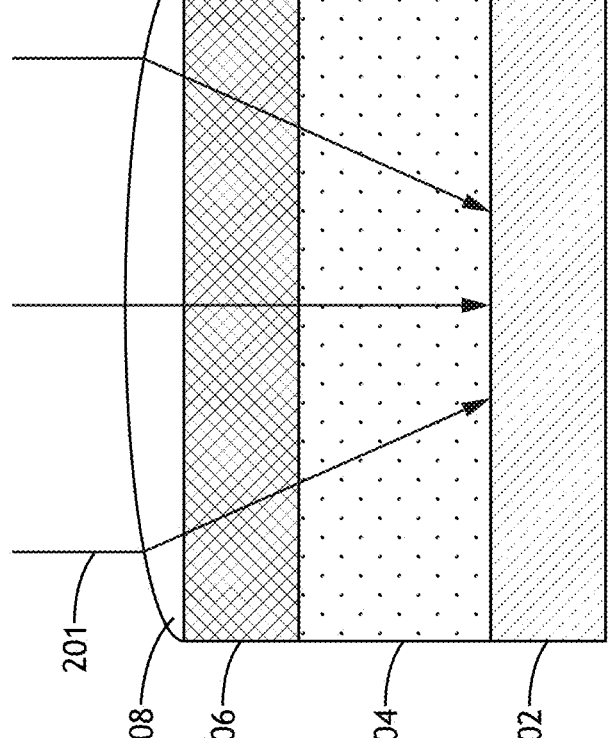

FIG. 2D depicts the inactive pixels 105, in accordance with one or more embodiments of the present disclosure. Although the inactive pixels 105 are described as being made inactive by the optical filter 206 and/or the optical filter 210, this is not intended as a limitation of the present disclosure.

The sample light 201 may pass through the inactive pixels 105 to the photodiode 202. The photodiode 202 of the inactive pixels 105 may accumulate charge for a different spectrum than the photodiode 202 of the active pixels 103. The photodiode 202 of the inactive pixels 105 may be made of a material which does not accumulate the charge for the wavelengths of the sample light 201. For example, the sample light 201 may be visible light with a wavelength between 380 and 750 nm. The photodiode 202 of the inactive pixels 105 may be made of a material which does not accumulate charge for the visible light. In this example, the photodiode 202 of the inactive pixels 105 may be made of Lead (II) sulfide which accumulates charge for light with wavelengths above 1000 nm, which is outside the visible spectrum. The photodiode 202 of the inactive pixels 105 may buffer the charge without accumulating additional of the charge when receiving the sample light 201. Thus, the photodiode 202 may make inactive the inactive pixels 105. The photodiode 202 of the active pixels 103 may be made of a material which accumulates the charge for the visible light. For example, the photodiode 202 of the active pixels 103 may be one of germanium or indium gallium arsenide. Thus, the photodiode 202 of the active pixels 103 may accumulate the charge from the visible light while the photodiode of the inactive pixels 105 may not accumulate additional of the charge.

The photodiode 202 of the inactive pixels 105 may not accumulate additional of the charge for the sample light 201 to which the photodiode 202 of the active pixels 103 accumulate the charge. The photodiode 202 may accumulate the charge outside of the spectrum of the sample light but may not accumulate the charge within the spectrum. The photodiode 202 of the active pixels 103 and the photodiode 202 of the inactive pixels 105 may accumulate charges for the sample light 201 with different wavelengths. For example, the photodiode 202 of the active pixels 103 may accumulate the charge for visible light and the photodiode 202 of the inactive pixels 105 may not accumulate the charge for visible light. The photodiode 202 of the inactive pixels 105 may buffer the charge from the previous row without regard to the wavelength for which the inactive pixels 105 are configured to accumulate.

Figure 3A:
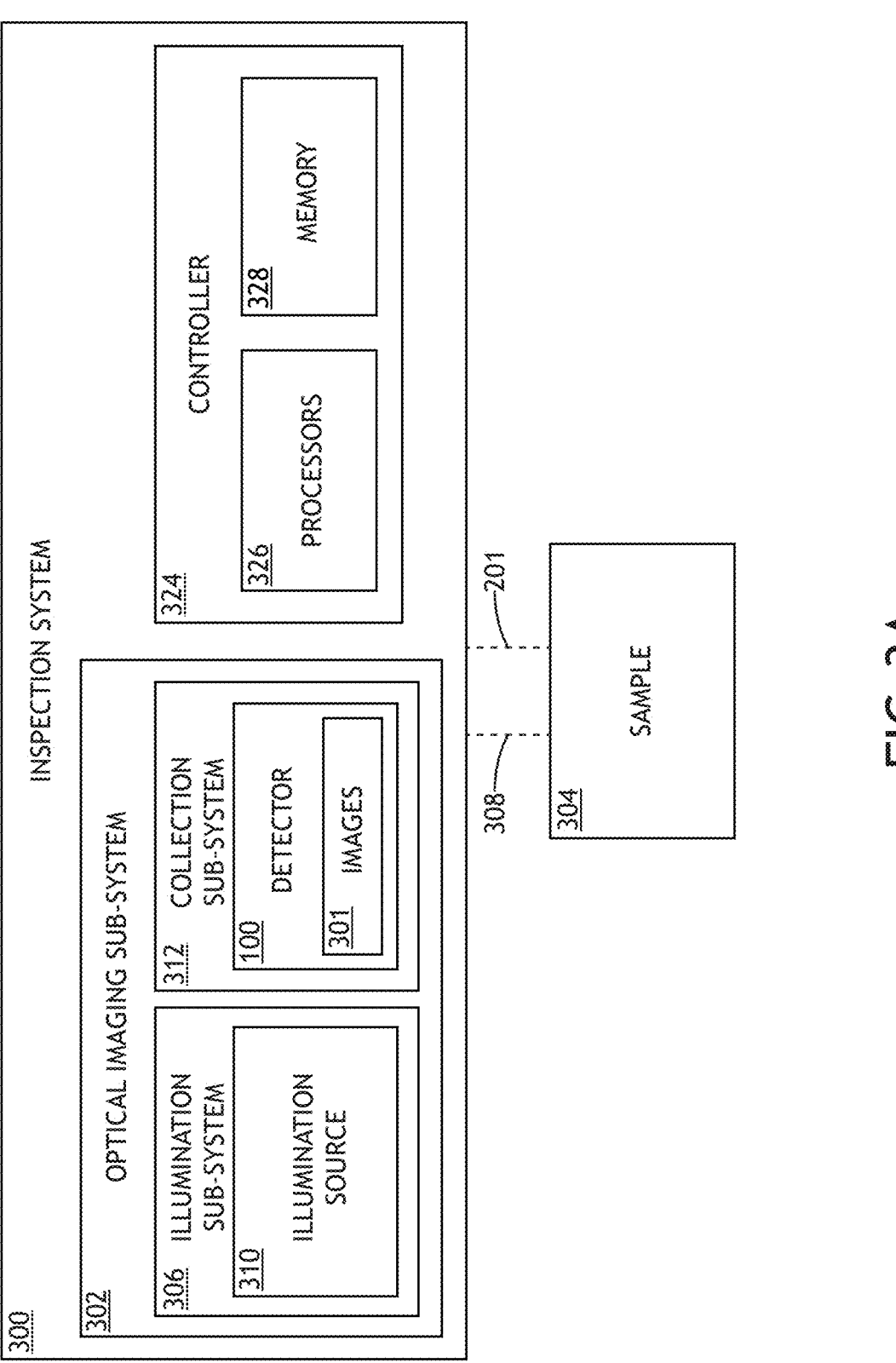
FIG. 3A depicts a simplified block diagram of an optical inspection system including the multi-mode TDI sensor, in accordance with one or more embodiments of the present disclosure.
Figure 3B:
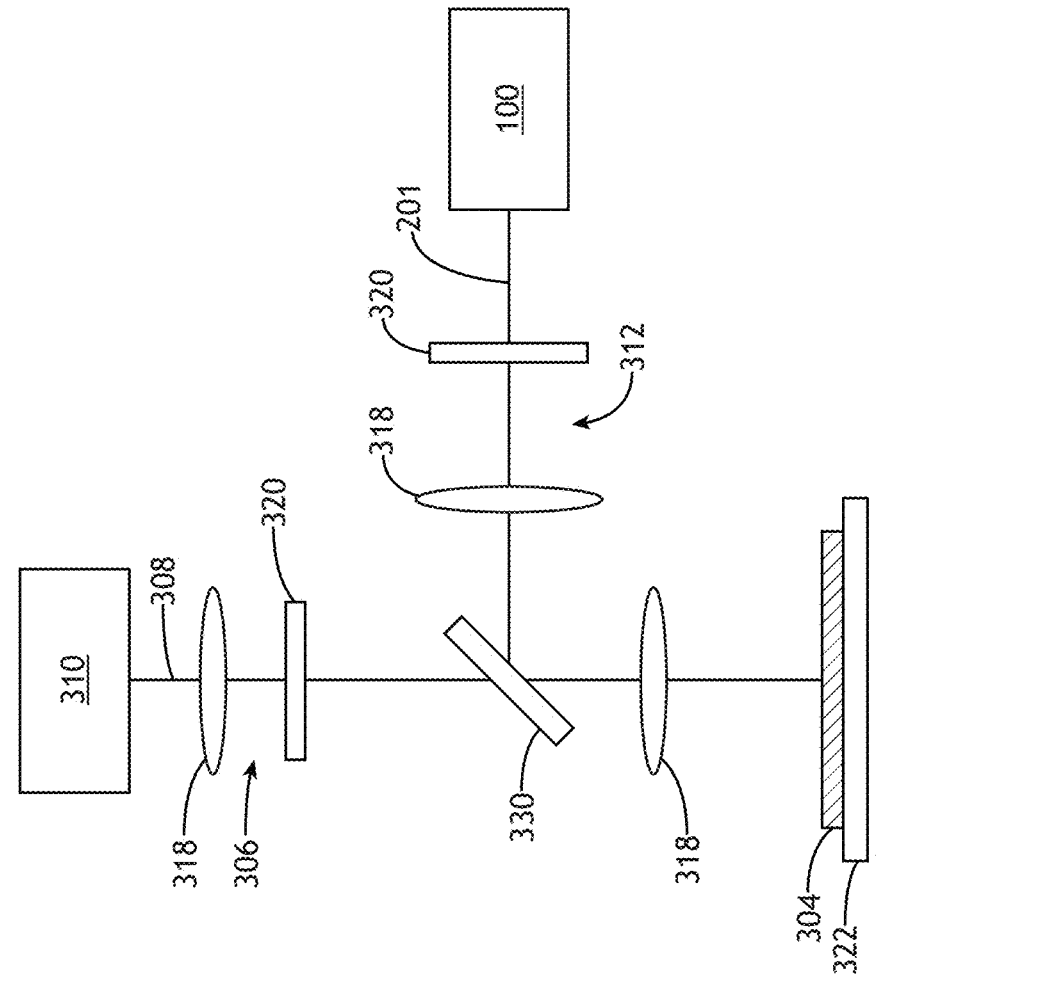
FIG. 3B depicts an example of the optical inspection system, in accordance with one or more embodiments of the present disclosure.

FIGS. 3A-3B depict an optical inspection system 300, in accordance with one or more embodiments of the present disclosure. The optical inspection system 300 may be configured in any optical configuration including, but not limited to, a dark-field configuration, a bright-field orientation, and the like.

The optical inspection system 300 may include optical imaging sub-systems 302. The optical imaging sub-systems 302 may be optical imaging tools. The optical imaging sub-systems 302 may include an illumination sub-system 306. The illumination sub-system 306 may be configured to illuminate the sample 304 with illumination 308 from an illumination source 310. The illumination source 310 may be an optical source configured to generate illumination 308 in the form of light. The illumination 308 may in the ultraviolet (UV) wavelengths, visible wavelengths, or infrared (IR) wavelengths. The illumination source 310 may include any type of illumination source known in the art suitable for generating the illumination 308, which may be in the form of one or more illumination beams. The illumination source 310 may further produce illumination 308 having any temporal profile. For example, the illumination source 310 may produce continuous-wave (CW) illumination, pulsed illumination, or modulated illumination. Additionally, the illumination 308 may be delivered from the illumination source 310 via free-space propagation or guided light (e.g., an optical fiber, a light pipe, or the like).

The sample 304 may include a substrate formed of a semiconductor or non-semiconductor material (e.g., a wafer, or the like). For example, a semiconductor or non-semiconductor material may include, but is not limited to, monocrystalline silicon, gallium arsenide, and indium phosphide. The sample 304 may further include one or more layers disposed on the substrate. For example, such layers may include, but are not limited to, a resist, a dielectric material, a conductive material, and a semiconductive material. Many different types of such layers are known in the art, and the term sample as used herein is intended to encompass a sample on which all types of such layers may be formed. One or more layers formed on a sample may be patterned or un-patterned. For example, a sample may include a plurality of dies, each having repeatable patterned features. Formation and processing of such layers of material may ultimately result in completed devices. Many different types of devices may be formed on a sample, and the term sample as used herein is intended to encompass a sample on which any type of device known in the art is being fabricated.

Sample light 201 may emanate from the sample 304 in response to the illumination 308. The optical imaging sub-systems 302 may include various components to collect at least a portion of the sample light 201 radiation emanating from the sample 304 and direct at least a portion of the sample light 201 to the multi-mode TDI sensor 100.

The optical imaging sub-systems 302, the illumination sub-system 306, and/or the collection sub-system 312 may include various components to direct the illumination 308 to the sample 304 and/or direct the sample light 201 to the multi-mode TDI sensor 100 such as, but not limited to, lenses 318, mirrors, or the like. Further, such components may be reflective elements or transmissive elements. In this way, the depiction of the lenses 318 as transmissive elements is merely illustrative and not limiting. The optical imaging sub-systems 302, the illumination sub-system 306, and/or the collection sub-system 312 may include optical elements 320. The optical elements 320 may modify and/or condition the illumination 308 and/or the sample light 201 in the associated optical path such as, but not limited to, one or more polarizers, one or more filters, one or more beamsplitters, one or more diffusers, one or more homogenizers, one or more apodizers, or one or more beam shapers. In a brightfield configuration, the optical imaging sub-systems 302, the illumination sub-system 306, and/or the collection sub-system 312 may include a beamsplitter 330 oriented to simultaneously direct the illumination 308 to the sample 304 and collect the sample light 201 emanating from the sample 304. The illumination 308 and the sample light 201 may share the same path between the beamsplitter 330 and the sample 304. In a darkfield configuration, the illumination 308 and the sample light 201 may not share the same path.

The optical imaging sub-systems 302 may be configured to generate images 301 of a sample 304. The optical imaging sub-systems 302 may include a collection sub-system 312. The collection sub-system 312 may be configured to generate the images 301 of the sample 304 in response to sample light 201 emanating from the sample 304. The collection sub-system 312 may include the multi-mode TDI sensor 100. The multi-mode TDI sensor 100 may receive the sample light 201. The multi-mode TDI sensor 100 may generate the images 301. The multi-mode TDI sensor 100 may generate the images 301 based on the sample light 201.

The images 301 generated by the optical inspection system 300 may be a brightfield image, a darkfield image, a phase-contrast image, or the like. The images 301 may be raw images from the optical imaging sub-systems 302. The images 301 may include various patterned features on the sample 304. The images 301 may be stitched together to form a composite image of the sample 304 or a portion thereof, although this is not intended as a limitation of the present disclosure. Although the images 301 have been described as including the patterned features, this is not intended as a limitation of the present disclosure. It is further contemplated that the images 301 may be from a sample or wafer with no patterned features.

The optical inspection system 300 may include a translation stage 322. The translation stage 322 may secure and/or position the sample 304 during imaging. For example, the translation stage 322 may include any combination of linear actuators, rotational actuators, or angle actuators to position the sample 304 using any number of degrees of freedom. The translation stage 322 may be an X-Y stage, an R-Θ stage, or the like.

The optical inspection system 300 may generate the images 301 of the sample 304 in a scanning mode. The optical inspection system 300 may generate the images 301 of the sample 304 by scanning the illumination 308 on the sample 304 to build up a two-dimensional image. Scanning may be achieved by moving the sample 304 with respect to the illumination 308 and/or the sample light 201. The sample 304 may move with respect to the illumination 308 and/or the sample light 201 using the translation stage 322, using actuatable mirrors, or the like. The scanning may include scanning the sample 304 along a scan path to generate a swath of the scan path.

The multi-mode TDI sensor 100 may be configured to simultaneously generate the images 301 from the sample light 201 with multiple optical modes. The optical mode may correspond to any combination of parameters used to generate the images 301 of the sample 304 including, but not limited to, properties of the illumination 308 directed to the sample 304 or the sample light 201 collected from the sample 304. Further, imaging with different optical modes may generally be performed with any number of optical imaging sub-systems 302. The readout circuit 106 of the multi-mode TDI sensor 100 may generate lines of images from the charges in the last row of the inactive pixel rows 104 as the sample 304 is scanned. The lines of images may alternate in the sequence of optical modes, according to the sequence of the active pixel rows 102 and the inactive pixel rows 104. The lines of images may be composited together as the sample 304 is scanned to form the images. The multi-mode TDI sensor 100 may simultaneously generate multiple of the images 301 in a single scan. The multi-mode TDI sensor 100 may allow increasing the number of the optical modes without introducing registration errors between the images 301.

The controller 324 may synchronize the motion of the sample light 201 relative to the sample 304 with switching between the optical modes. The sample light 201 may be scanned over a select length before switching between the optical modes. The length to which the sample light is scanned before switching between the optical modes may be based on the pixel length (e.g., the length of the active pixels 103 and/or the inactive pixels 105) divided by the number of optical modes. For example, the sample light 201 may move by ½ of a pixel length in the scan direction for each of the scan at the two modes for a two-mode TDI sensor. By way of another example, the sample light 201 may move by ⅓ of a pixel length in the scan direction for each of the scan at the three modes for a three-mode TDI sensor. Each line of charge may then maintain consistent registration or positioning by scanning and switching between the optical modes based on the pixel length and the number of optical modes.

The optical imaging sub-systems 302 may be include two or more of the collection sub-systems 312, each having separate of the multi-mode TDI sensors 100. The optical imaging sub-systems 302 may have one or more of the beamsplitters 330 to split the sample light 201 into the various channels and/or optical elements 320 (e.g., separate spectral filters, polarizers, or the like) to provide separate control of the properties of the sample light 201 directed to the multi-mode TDI sensor 100 in each of the collection sub-systems 312.

The multi-mode TDI sensor 100 may provide several benefits. For example, the multi-mode TDI sensor 100 may simultaneously generate the images 301 with multiple modes even where the optical imaging sub-systems includes one of the collection sub-systems 312. By way of another example, the multi-mode TDI sensor 100 may allow generating the images 301 with different angular sensitivities or different illumination levels using a single scan.

The optical inspection system 300 may include a controller 324. The controller 324 may include one or more processors 326 configured to execute program instructions maintained on a memory 328 (e.g., a memory medium). The one or more processors 326 of controller 324 may execute any of the various process steps described throughout the present disclosure. The controller 324 may be communicatively coupled to the one or more optical inspection sub-systems 302. The controller 324 may receive images from the optical inspection sub-systems 302.

The one or more processors 326 of the controller 324 may include any processing element known in the art. In this sense, the one or more processors 326 may include any microprocessor-type device configured to execute algorithms and/or instructions. The one or more processors 326 may include a desktop computer, mainframe computer system, workstation, image computer, parallel processor, or any other computer system (e.g., networked computer) configured to execute a program configured to operate the optical inspection system 300, as described throughout the present disclosure. It is further recognized that the term "processor" may be broadly defined to encompass any device having one or more processing elements, which execute program instructions from memory 328.

The memory 328 may include any storage medium known in the art suitable for storing program instructions executable by the one or more processors 326. For example, the memory 328 may include a non-transitory memory medium. By way of another example, the memory 328 may include, but is not limited to, a read-only memory, a random-access memory, a magnetic or optical memory device (e.g., disk), a magnetic tape, a solid-state drive, and the like. It is further noted that memory 328 may be housed in a common controller housing with the one or more processors 326. The memory 328 may be located remotely with respect to the physical location of the one or more processors 326 and controller 324. For instance, the one or more processors 326 of controller 324 may access a remote memory (e.g., server), accessible through a network (e.g., internet, intranet, and the like). Therefore, the above description should not be interpreted as a limitation on the present invention but merely an illustration.

An optical mode provided by the optical imaging sub-systems 302 may be controlled based on control of any combination of components in the illumination sub-system 306 or the collection sub-system 312. For example, control of the illumination 308 directed to the sample 304 may be provided by the illumination source 310 directly and/or by optical elements 320 such as, but not limited to, a spectral filter to control a wavelength of the illumination 308, a polarizer to control a polarization of the illumination 308, or an apodizer (e.g., in an illumination pupil plane) to control an angular distribution of the illumination 308 on the sample 304. As another example, control of the sample light 201 collected from the sample 304 and passed to the multi-mode TDI sensor 100 may be provided by optical elements 320 such as, but not limited to, a spectral filter to control a wavelength of the sample light 201 passed to the multi-mode TDI sensor 100, a polarizer to control a polarization of the sample light 201 passed to the multi-mode TDI sensor 100, or an apodizer (e.g., in a collection pupil plane) to control an angular distribution of the sample light 201 passed to the multi-mode TDI sensor 100.

As an illustration, a particular optical mode may correspond to illumination 308 with a selected spectrum (e.g., as described by a bandwidth and/or a central wavelength) and a selected polarization directed to the sample with a selected incidence angle (e.g., as defined by an illumination aperture or apodizer). The optical mode may further correspond to a particular spectrum and polarization of the sample light 201 directed to the multi-mode TDI sensor 100 (both of which may be the same or different than for the illumination 308 incident on the sample 304).

Further, the illumination source 310 and/or any of the optical elements 320 may be adjustable such that the optical inspection system 300 may be configured to provide different optical modes. For example, any of the optical elements 320 may be directly tunable and/or controllable by actuators to provide different optical modes. In some embodiments, the controller 324 generates drive signals for the illumination source 310 and/or any of the optical elements 320 to select-ably provide different optical modes.

Multi-mode inspection may provide substantially superior performance (e.g., discrimination between defects and background signals) than single-mode inspection techniques. Further, increasing the number of optical modes may generally increase the inspection performance. The images 301 generated from different optical modes may provide a highest difference between printed material and substrate of the sample 304 and/or identify dust within the images 301.

Figure 4:
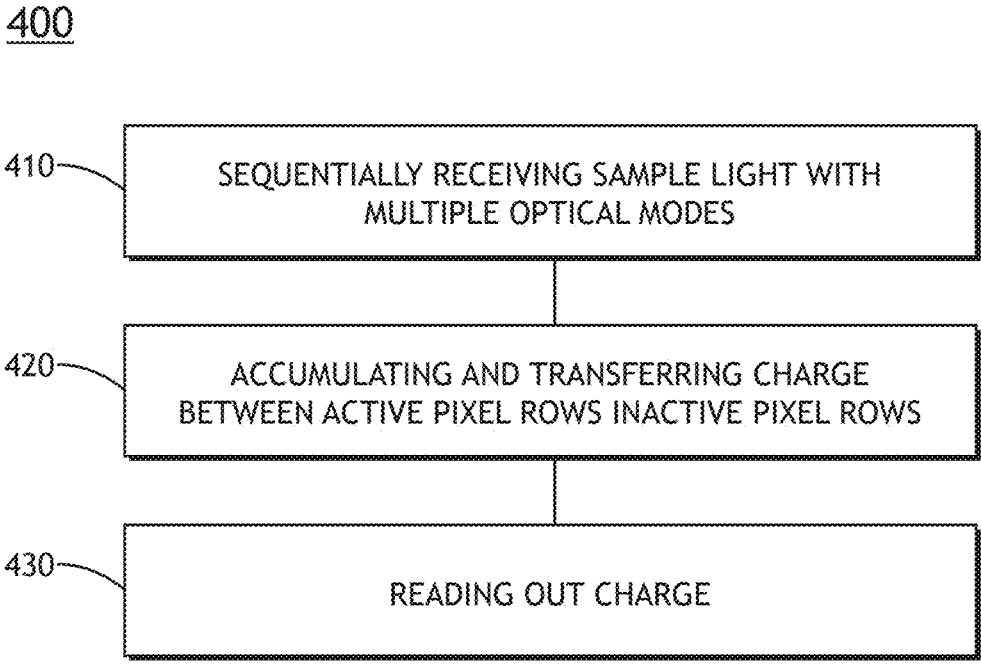
FIG. 4 depicts a flow diagram of a method, in accordance with one or more embodiments of the present disclosure.

FIG. 4 depicts a flow diagram of a method 400, in accordance with one or more embodiments of the present disclosure. The embodiments and the enabling technologies described previously herein in the context of the optical inspection system 300 should be interpreted to extend to the method 400. It is further noted, however, that the method 400 is not limited to the architecture of the optical inspection system 300.

In a step 410, sample light may be sequentially received with multiple optical modes by a multi-mode TDI sensor. For example, the sample light 201 may be sequentially received with multiple optical modes by the multi-mode TDI sensor 100. The controller 324 may cause the multi-mode TDI sensor 100 to sequentially received with multiple optical modes by adjusting the illumination source 310 and/or any of the optical elements 320. The multiple optical modes may alternate between at least two optical modes as the sample light 201 is received from a scan across the sample 304. The sample light 201 may scan across the sample 304. Thus, the sample light 201 may move relative to the sample 304. The sample light 201 may scan across the sample 304 at a select scan velocity. The scan velocity may be reduced by a factor according to the number of optical modes for which the multi-mode TDI sensor 100 is configured. For example, the scan velocity of the two-mode TDI sensor may be half of the scan velocity of a single-mode TDI sensor. The sample light 201 may alternate in sequence between the optical modes in at a mode switching rate.

In a step 420, charge may be accumulated in active pixel rows and transferred between the active pixel rows and inactive pixel rows of the multi-mode TDI sensor as the sample light is sequentially received. For example, charge may be accumulated in the active pixel rows 102 and transferred between the active pixel rows 102 and inactive pixel rows 104 of the multi-mode TDI sensor 100 as the sample light 201 is sequentially received. The controller 324 may cause the multi-mode TDI sensor 100 to accumulate the charge and transfer the charge between the active pixel rows 102 and inactive pixel rows 104. The charge may be accumulated in active pixel rows and transferred between the active pixel rows and inactive pixel rows of the multi-mode TDI sensor as the sample light is sequentially received.

Charge accumulated from the sample light 201 may be accumulated separately in each of the optical modes. The charge transfer rate at which charge may be transferred between the active pixel rows 102 and inactive pixel rows 104 may be synchronized to the mode switching rate at which the sample light 201 may alternate in sequence between the optical modes. Thus, the charge may be transferred between the active pixel rows 102 and inactive pixel rows 104 as the sample light 201 switched between the optical modes. The charge transfer rate and/or the mode switching rate may be determined based on the based on the scan velocity at which the sample light 201 may scan across the sample 304 and/or to the dimensions of the active pixel rows 102 and inactive pixel rows 104. For example, the mode switching rate may be selected such that the sample light 201 switches between the optical modes as the sample light 201 is disposed at the interface between the active pixel rows 102 and inactive pixel rows 104. Thus, charge accumulated from the sample light 201 in one optical mode may not integrate into charge accumulated from the sample light 201 in another optical mode.

In a step 430, charge may be readout from the multi-mode TDI sensor. For example, the charge may be readout from the multi-mode TDI sensor 100 via the readout circuit 106. The charge readout may be separated in sequence according to the optical modes. The controller 324 may readout the charge via the readout circuit 106. The charge readout may be synchronized with the charge transfer rate at which charge may be transferred between the active pixel rows 102 and inactive pixel rows 104. The charge may be readout as lines of the images 301. The lines may be compiled together to form the images 301 generated from the multiple-modes.

FIGS. 5A-5J depict an example of the multi-mode TDI sensor 100 as the two-mode TDI sensor, in accordance with one or more embodiments of the present disclosure. The two-mode TDI sensor may accumulate lines 502 of the charge. The lines 502 of the charge may include first-mode lines 502a generated from a first optical mode and second-mode lines 502b generated from a second optical mode. The first-mode lines 502a generated from the first optical mode may be compiled to generate the image 301 at the first optical mode. Similarly, the second-mode lines 502b generated from the second optical mode may be compiled to generate the image 301 at the second optical mode. The images 301 at the first optical mode and at the second optical mode may be compiled from multiple of the first-mode lines 502a and the second-mode lines 502b, respectively. For example, the images 301 may be compiled from tens, hundreds, thousands, or more of the lines 502.

The first-mode lines 502a may be offset from the second-mode lines 502b by one-half of a pixel length. For example, the scan velocity of the sample light 201 may cover one-half of the pixel length. Thus, the image 301 of the first mode may be offset by one-half pixel length from the image 301 of the second mode.

The two-mode TDI sensor may accumulate the first-mode lines 502a and the second-mode lines 502b in the active pixel rows 102. The first-mode lines 502a may be accumulated in the active pixel rows 102 while the second-mode lines 502b are held in the inactive pixel rows 104. Similarly, the second-mode lines 502b may be accumulated in the active pixel rows 102 while the first-mode lines 502a are held in the inactive pixel rows 104. The first-mode lines 502a and the second-mode lines 502b may be transferred between the active pixel rows 102 and the inactive pixel rows 104 up to the readout circuit 106.

In this example, a first-mode first line 502a-1 and a second-mode first line 502b-1 at the first and second optical mode, respectively, are depicted. The first-mode first line 502a-1 is an example of a first line of the first-mode lines 502a of the image 301 generated at the first mode. The second-mode first line 502b-1 is an example of a first line of the second-mode lines 502b of the image 301 generated at the second mode.

Figure 5A:
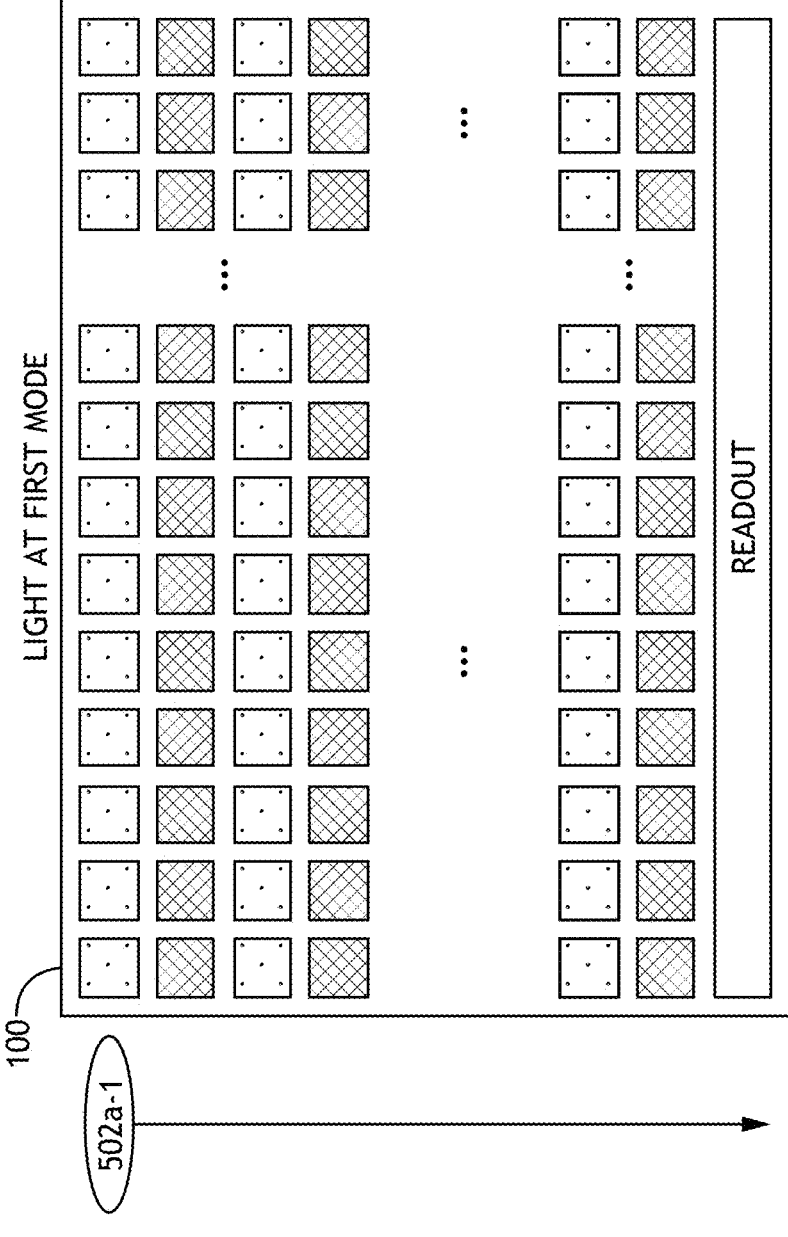
FIGS. 5A-5J depict a two-mode TDI sensor accumulating first-mode and second-mode lines, in accordance with one or more embodiments of the present disclosure.

In FIG. 5A, the first active pixel row 102-1 accumulates the first-mode first line 502a-1 while the sample light 201 is at the first optical mode. The first active pixel row 102-1 may be positioned at an original position as the sample light 201 starts accumulating. The sample light 201 may be scanned one-half pixel length as the sample light 201 is accumulated. The first active pixel row 102-1 may be positioned at a one-half pixel length from the original position after scanning and accumulating. Between FIG. 5A and FIG. 5B, the first active pixel row 102-1 transfers the first-mode first line 502a-1 to the first inactive pixel row 104-1.

Figure 5B:
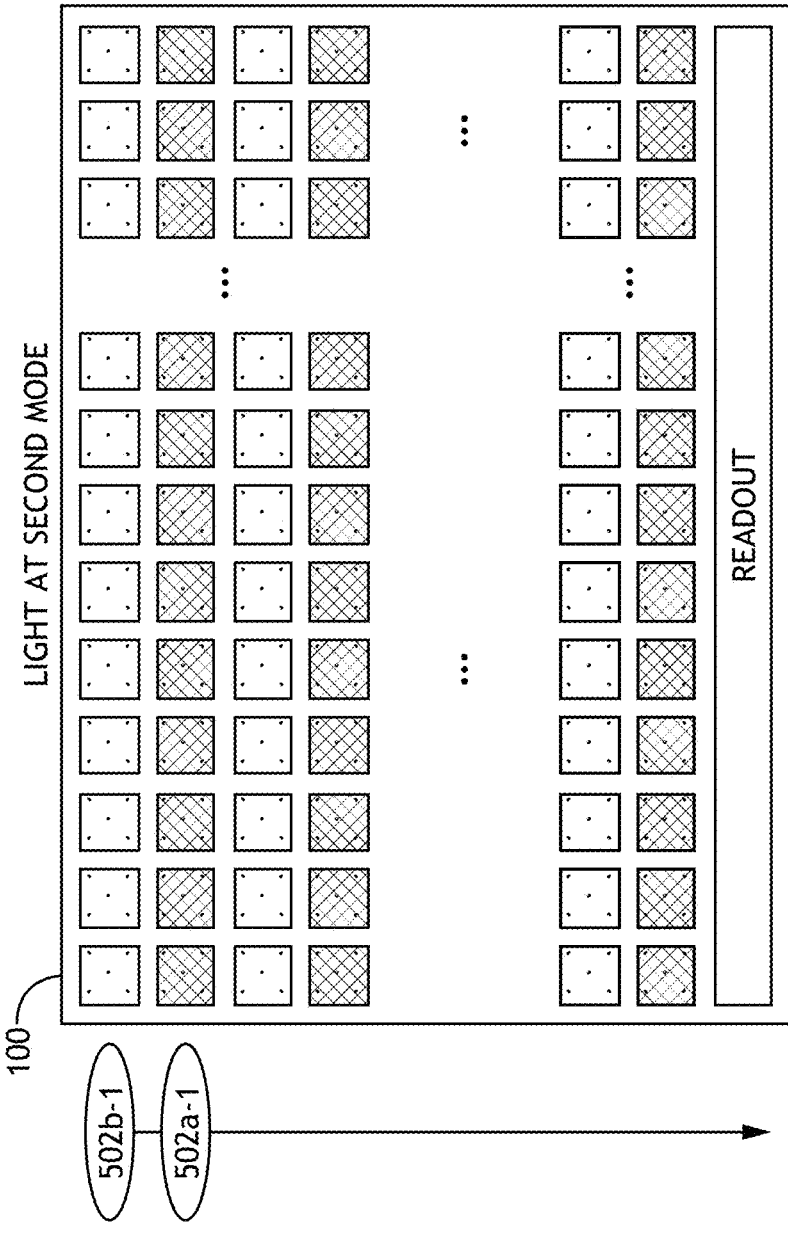

In FIG. 5B, the first active pixel row 102-1 accumulates the second-mode first line 502b-1 and the first inactive pixel row 104-1 buffers the first-mode first line 502a-1 while the sample light 201 is at the second optical mode. The first inactive pixel row 104-1 does not accumulate additional of the charge from the light at the second mode, such that the first-mode first line 502a-1 is buffered. The first active pixel row 102-1 may be positioned at the one-half pixel length from the original position and the first inactive pixel row 104-1 may be positioned at the original position as the sample light 201 starts accumulating. The sample light 201 may be scanned one-half pixel length as the sample light 201 is accumulated. The second active pixel row 102-2 may be positioned at the original position and the first active pixel row 102-1 may be positioned at one pixel length from the original position after scanning and accumulating. Between FIG. 5B and FIG. 50, the first active pixel row 102-1 transfers the second-mode first line 502b-1 to the first inactive pixel row 104-1 and the first inactive pixel row 104-1 transfers the first-mode first line 502a-1 to the second active pixel row 102-2.

Figure 5C:
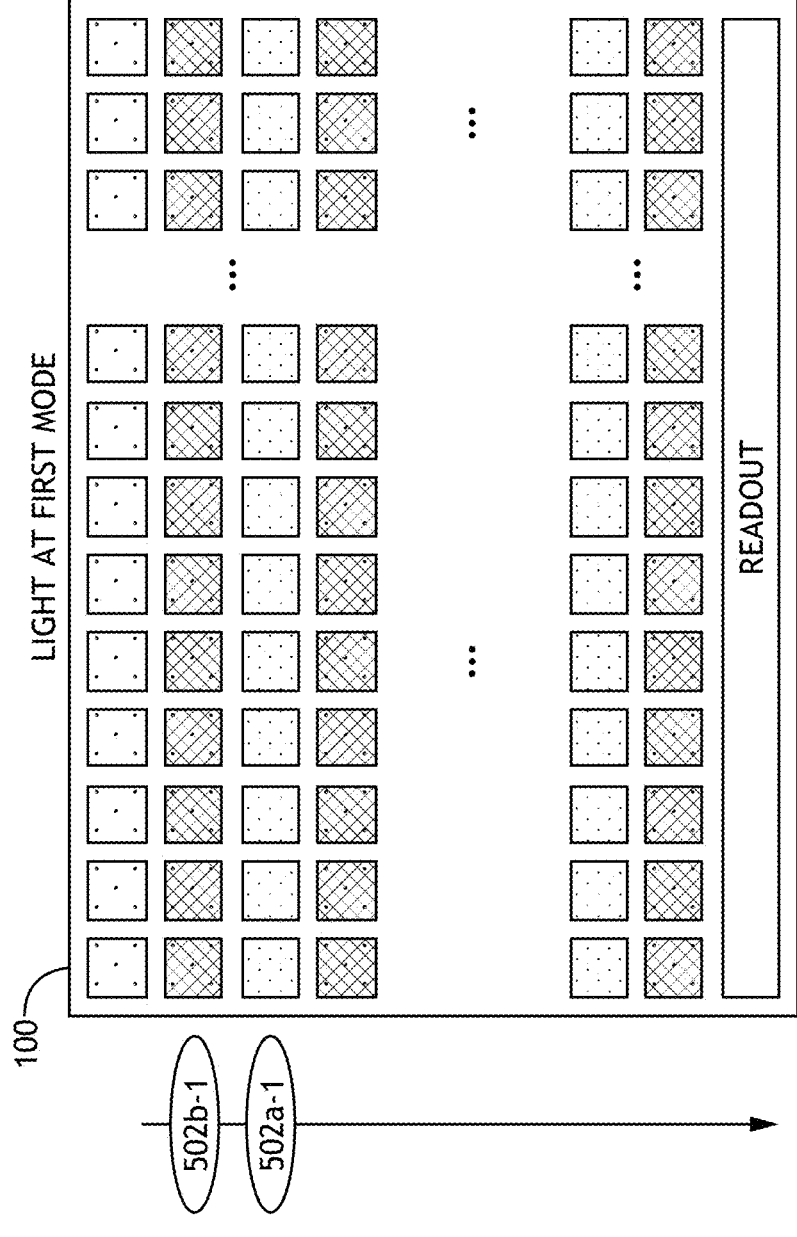

In FIG. 5C, the first inactive pixel row 104-1 buffers the second-mode first line 502b-1 and the second active pixel row 102-2 accumulates the first-mode first line 502a-1 while the sample light 201 is at the first optical mode. The first inactive pixel row 104-1 does not accumulate additional of the charge from the light at the first mode, such that the second-mode first line 502b-1 is buffered. The first inactive pixel row 104-1 may be positioned at the one-half pixel length from the original position and the second active pixel row 102-2 may be positioned at the original position as the sample light 201 starts accumulating. The sample light 201 may be scanned one-half pixel length as the sample light 201 is accumulated. Between FIG. 5C and FIG. 5D, the first inactive pixel row 104-1 transfers the second-mode first line 502b-1 to the second active pixel row 102-2 and the second active pixel row 102-2 transfers the first-mode first line 502a-1 to the second inactive pixel row 104-2.

Figure 5D:
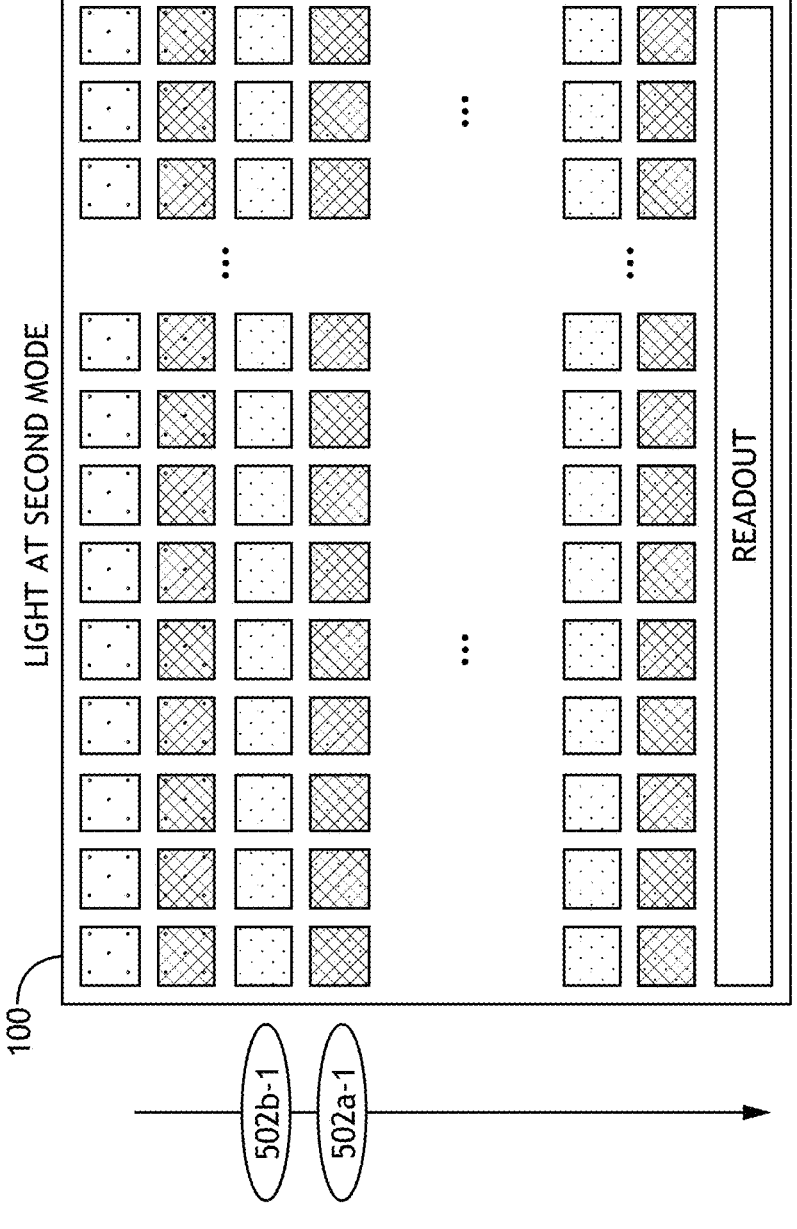
Figure 5D:

In FIG. 5D, the second active pixel row 102-2 accumulates the second-mode first line 502b-1 and the second inactive pixel row 104-2 buffers the first-mode first line 502a-1 while the sample light 201 is at the second optical mode. The second inactive pixel row 104-2 does not accumulate additional of the charge from the light at the second mode, such that the first-mode first line 502a-1 is buffered. The second active pixel row 102-2 may be positioned at the one-half pixel length from the original position and the second inactive pixel row 104-2 may be positioned at the original position as the sample light 201 starts accumulating. The sample light 201 may be scanned one-half pixel length as the sample light 201 is accumulated. Between FIG. 5D and FIG. 5E, the second active pixel row 102-2 transfers the second-mode first line 502b-1 to the second inactive pixel row 104-2 and the second inactive pixel row 104-2 transfers the first-mode first line 502a-1 to a third active pixel row (not depicted).

Figure 5E:
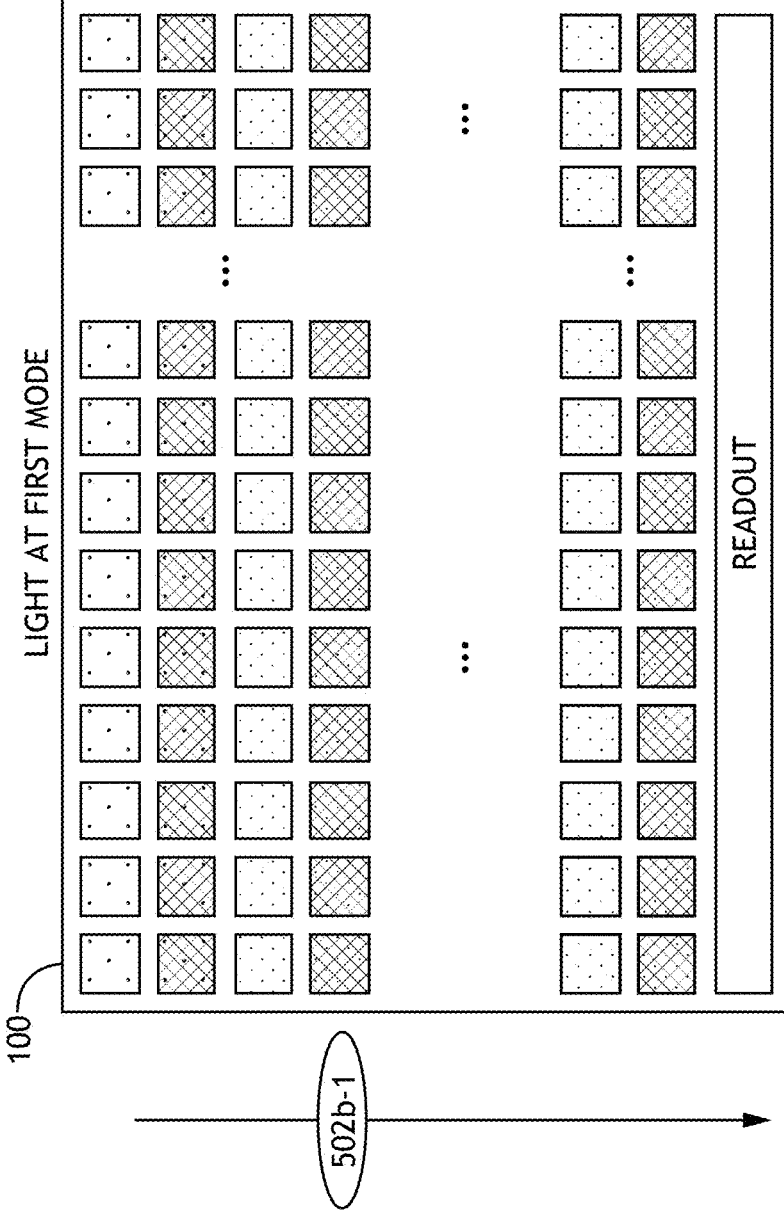

In FIG. 5E, the second inactive pixel row 104-2 buffers the second-mode first line 502b-1 while the sample light 201 is at the first optical mode. The second inactive pixel row 104-2 does not accumulate additional of the charge from the light at the second mode, such that the second-mode first line 502b-1 is buffered. The second inactive pixel row 104-2 may be positioned at the one-half pixel length from the original position as the sample light 201 starts accumulating. The sample light 201 may be scanned one-half pixel length as the sample light 201 is accumulated. Between FIG. 5E and FIG. 5F, the second inactive pixel row 104-2 transfers the second-mode first line 502b-1 to the third active pixel row.

Figure 5F:
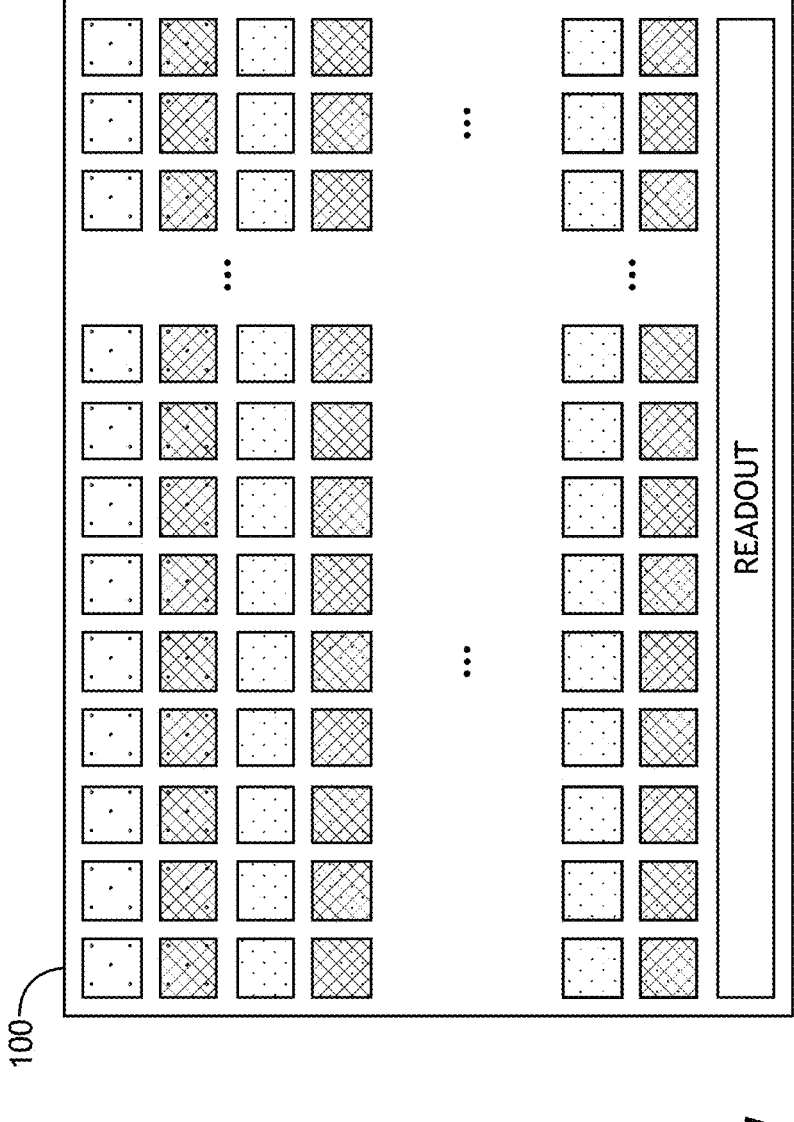

In FIG. 5F, the first-mode first line 502a-1 and the second-mode first line 502b-1 may continue to be accumulated, be held, and be transferred between the active pixel rows 102 and the inactive pixel rows 104 up to a last active pixel row 102-n. Between FIG. 5F and FIG. 5G, a second-to-last inactive pixel row (not depicted) transfers the first-mode first line 502a-1 to the last active pixel row 102-n.

Figure 5G:
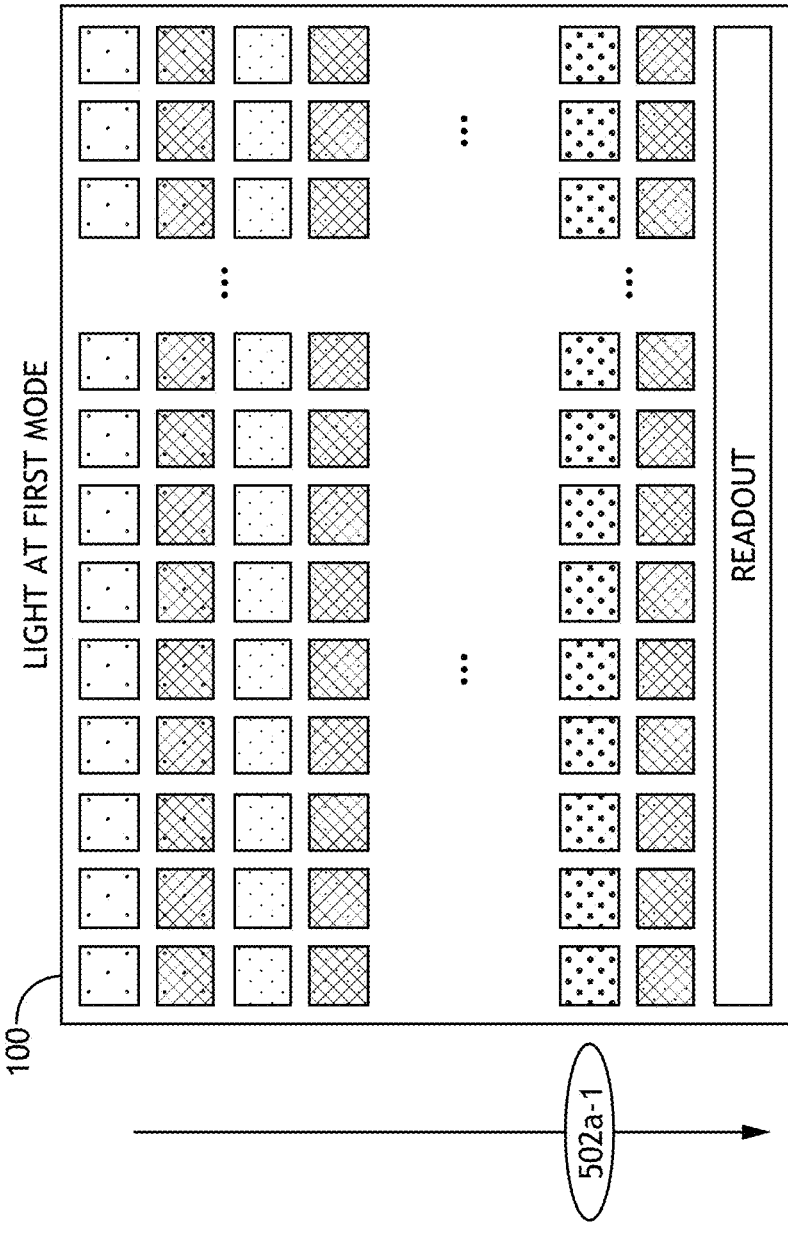

In FIG. 5G, the last active pixel row 102-n accumulates the first-mode first line 502a-1 while the sample light 201 is at the first optical mode. The last active pixel row 102-n may be positioned at the original position as the sample light 201 starts accumulating. The sample light 201 may be scanned one-half pixel length as the sample light 201 is accumulated. Between FIG. 5G and FIG. 5H, the second-to-last inactive pixel row transfers the second-mode first line 502b-1 to the last active pixel row 102-n and the last active pixel row 102-n transfers the first-mode first line 502a-1 to the last inactive pixel row 104-n.

Figure 5H:
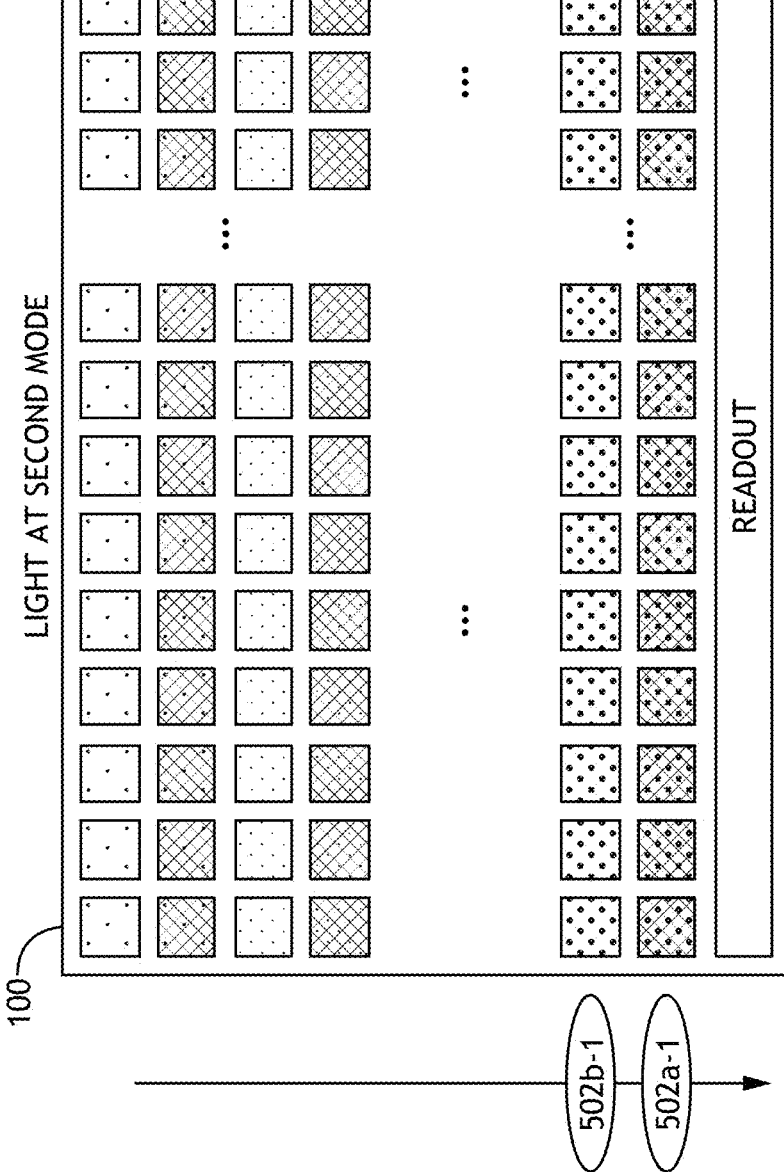

In FIG. 5H, the last active pixel row 102-n accumulates the second-mode first line 502b-1 and the last inactive pixel row 104-n buffers the first-mode first line 502a-1 while the sample light 201 is at the second optical mode. The last inactive pixel row 104-n does not accumulate additional of the charge from the light at the second mode, such that the first-mode first line 502a-1 is buffered. The last active pixel row 102-n may be positioned at the one-half pixel length from the original position and the last inactive pixel row 104-n may be positioned at the original position as the sample light 201 starts accumulating. The sample light 201 may be scanned one-half pixel length as the sample light 201 is accumulated. Between FIG. 5H and FIG. 5I, the last active pixel row 102-n transfers the second-mode first line 502b-1 to the last inactive pixel row 104-n and the last inactive pixel row 104-n transfers the first-mode first line 502a-1 to the readout circuit 106.

Figure 5I:
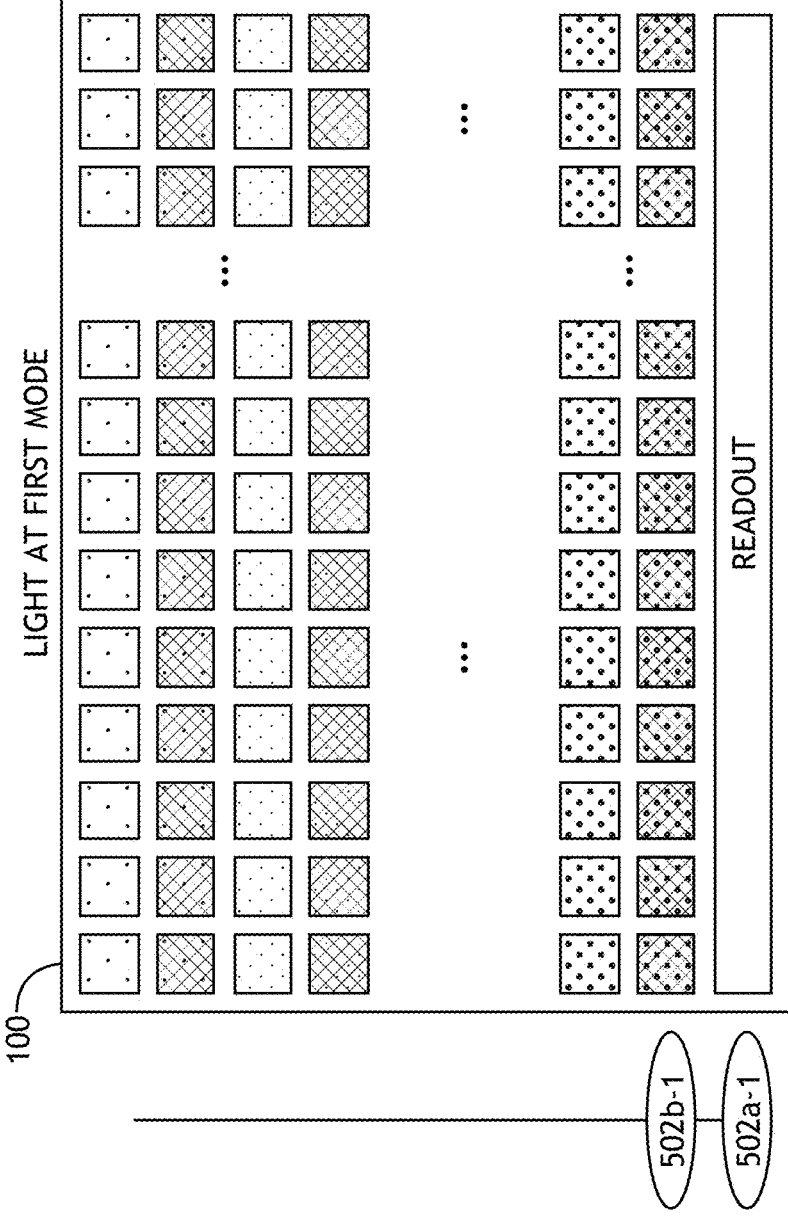

In FIG. 5I, the last inactive pixel row 104-n buffers the second-mode first line 502b-1 and the readout circuit 106 reads out the first-mode first line 502a-1 while the sample light 201 is at the first optical mode. The last inactive pixel row 104-n does not accumulate additional of the charge from the light at the first mode, such that the second-mode first line 502b-1 is buffered. The last inactive pixel row 104-n may be positioned at the one-half pixel length from the original position as the sample light 201 starts accumulating. The sample light 201 may be scanned one-half pixel length as the sample light 201 is accumulated. The readout circuit 106 reads out the first-mode first line 502a-1 as a first line in the image 301 generated at the first optical mode. Between FIG. 5I and FIG. 5J, the last inactive pixel row 104-n transfers the second-mode first line 502b-1 to the readout circuit 106.

Figure 5J:
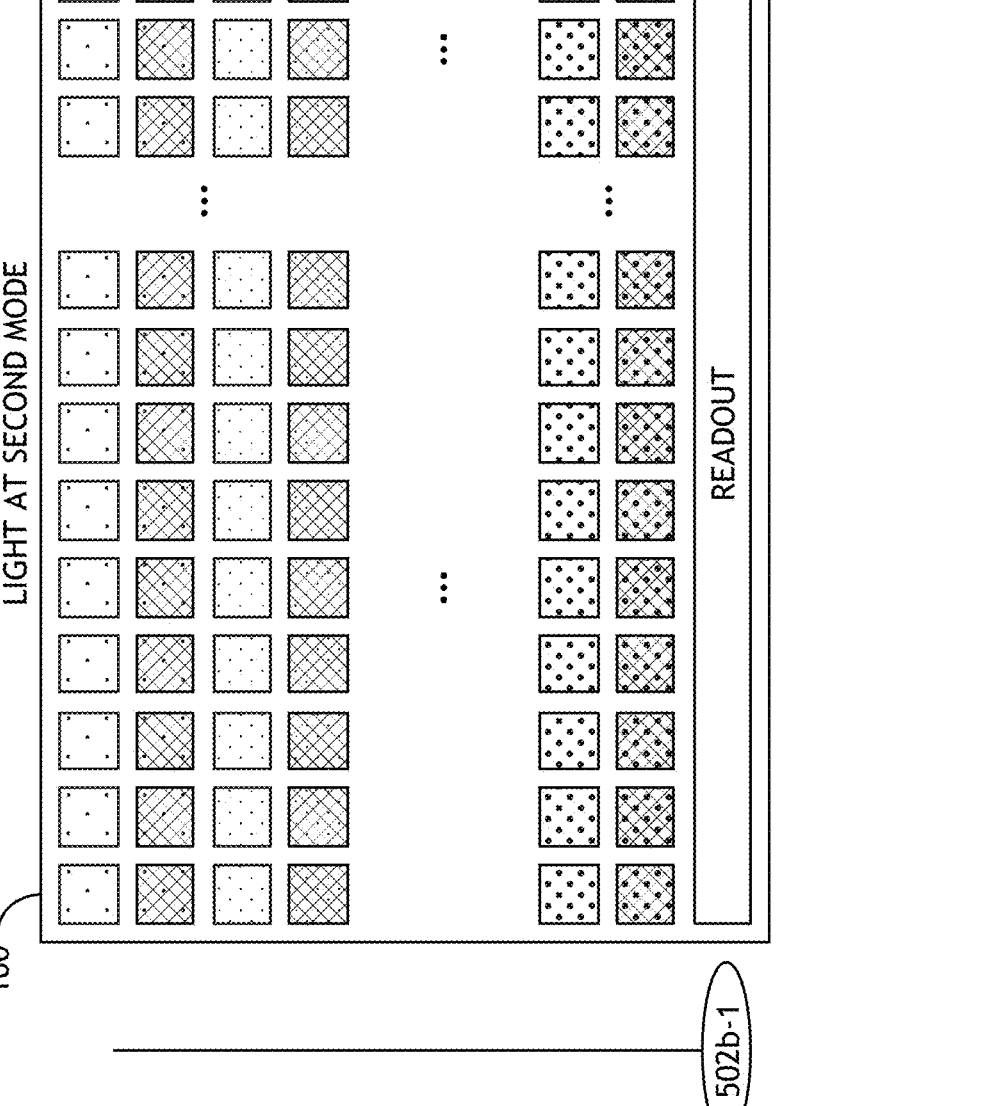

In FIG. 5J, the readout circuit 106 reads out the second-mode first line 502b-1 while the sample light 201 is at the second optical mode. The readout circuit 106 reads out the second-mode first line 502b-1 as a first line in the image 301 generated at the second optical mode.

The multi-mode TDI sensor 100 may accumulate and read out additional of the first-mode lines 502a and the second-mode lines 502b (not depicted) to generate the images 301 at the first optical mode and the second optical mode, respectively. Thus, lines of two separate images may be simultaneously accumulated from light at different optical modes and then readout by the multi-mode TDI sensor 100. The lines may alternate in the sequence of the optical modes. Furthermore, the lines 502 may be accumulated with consistent positioning over the sample 304.

Referring generally again to the figures. A controller may include one or more controllers housed in a common housing or within multiple housings. In this way, any controller or combination of controllers may be separately packaged as a module suitable for integration into a system. Further, the controllers may analyze data received from detectors and feed the data to additional components within the system or external to the system.

As used throughout the present disclosure, the term "substrate" generally refers to a substrate formed of a semiconductor or non-semiconductor material (e.g., thin filmed glass, or the like). For example, a semiconductor or non-semiconductor material may include, but is not limited to, monocrystalline silicon, gallium arsenide, indium phosphide, or a glass material. A substrate may include one or more layers. For example, such layers may include, but are not limited to, a resist (including a photoresist), a dielectric material, a conductive material, and a semiconductive material. Many different types of such layers are known in the art, and the term sample as used herein is intended to encompass a substrate on which all types of such layers may be formed. One or more layers formed on a substrate may be patterned or un-patterned. For example, a substrate may include a plurality of dies, each having repeatable patterned features. Formation and processing of such layers of material may ultimately result in completed devices. Many different types of devices may be formed on a substrate, and the term substrate as used herein is intended to encompass a substrate on which any type of device known in the art is being fabricated. Further, for the purposes of the present disclosure, the term substrate and wafer should be interpreted as interchangeable. In addition, for the purposes of the present disclosure, the terms patterning device, mask and reticle should be interpreted as interchangeable.

It is further contemplated that each of the embodiments of the methods described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mixable and/or physically interacting components and/or wirelessly inter-actable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A multi-mode TDI sensor comprising:
a plurality of active pixel rows, wherein the plurality of active pixel rows are configured to accumulate charge based on sample light received by the plurality of active pixel rows;
a plurality of inactive pixel rows, wherein the plurality of inactive pixel rows are configured to buffer the charge without accumulating additional of the charge in response to receiving the sample light, wherein the plurality of active pixel rows and the plurality of inactive pixel rows alternate in a sequence, wherein the sequence defines a plurality of optical modes for which the multi-mode TDI sensor is configured, wherein the charge is configured to transfer between the plurality of active pixel rows and the plurality of inactive pixel rows in the sequence; and a readout circuit, wherein the readout circuit is configured to readout the charge as separate images for each of the plurality of optical modes.

2. The multi-mode TDI sensor of claim 1, wherein the multi-mode TDI sensor is configured for at least two optical modes.

3. The multi-mode TDI sensor of claim 2, wherein the sequence is one of the plurality of active pixel rows followed by an integer number of the plurality of inactive pixel rows, where the integer number is the plurality of optical modes for which the multi-mode TDI sensor is configured minus one.

4. The multi-mode TDI sensor of claim 3, wherein the multi-mode TDI sensor is a two-mode TDI sensor configured for two optical modes, wherein the sequence is one of the plurality of active pixel rows followed by one of the plurality of inactive pixel rows.

5. The multi-mode TDI sensor of claim 3, wherein the multi-mode TDI sensor is a three-mode TDI sensor configured for three optical modes, wherein the sequence is one of the plurality of active pixel rows followed by two of the plurality of inactive pixel rows.

6. The multi-mode TDI sensor of claim 1, wherein a last of the plurality of inactive pixel rows is configured to transfer the charge to the readout circuit.

7. The multi-mode TDI sensor of claim 1, wherein the separate images are readout as lines which alternate between the plurality of optical modes according to the sequence.

8. The multi-mode TDI sensor of claim 1, wherein the plurality of active pixel rows each comprise a row of a plurality of active pixels, wherein the plurality of inactive pixel rows each comprise a row of a plurality of inactive pixels.

9. The multi-mode TDI sensor of claim 8, wherein the sample light comprises a spectrum of at least one of one of an ultraviolet wavelength, a visible wavelength, or an infrared wavelength.

10. The multi-mode TDI sensor of claim 9, wherein the plurality of inactive pixels comprise a photodiode and an optical filter, wherein the optical filter makes inactive the plurality of inactive pixels.

11. The multi-mode TDI sensor of claim 10, wherein the optical filter is an intermediate layer within the plurality of inactive pixels.

12. The multi-mode TDI sensor of claim 10, wherein the optical filter is a mask formed over a top of the plurality of inactive pixels.

13. The multi-mode TDI sensor of claim 10, wherein the optical filter is configured to filter the spectrum of the sample light.

14. The multi-mode TDI sensor of claim 10, wherein the optical filter is configured to filter each wavelength for which the photodiode is configured to accumulate the charge.

15. The multi-mode TDI sensor of claim 9, wherein the plurality of active pixels and the plurality of inactive pixels comprise a photodiode, wherein the photodiode of the plurality of inactive pixels is configured to accumulate charge within the spectrum, wherein the photodiode of the plurality of inactive pixels is not configured to accumulate the charge within the spectrum.

16. The multi-mode TDI sensor of claim 15, wherein the sample light is visible light.

17. The multi-mode TDI sensor of claim 1, wherein the readout circuit is configured to generate a plurality of lines of the separate images, wherein the plurality of lines alternate in the sequence of the plurality of optical modes.

18. An optical inspection system comprising:

at least one illumination source configured to generate illumination;

a multi-mode TDI sensor comprising:

a plurality of active pixel rows, wherein the plurality of active pixel rows are configured to accumulate charge based on sample light received by the plurality of active pixel rows, wherein the sample light emanates from a sample in response to the illumination;

a plurality of inactive pixel rows, wherein the plurality of inactive pixel rows are configured to buffer the charge without accumulating additional of the charge in response to receiving the sample light, wherein the plurality of active pixel rows and the plurality of inactive pixel rows alternate in a sequence, wherein the sequence defines a plurality of optical modes for which the multi-mode TDI sensor is configured, wherein the charge is configured to transfer between the plurality of active pixel rows and the plurality of inactive pixel rows in the sequence; and a readout circuit, wherein the readout circuit is configured to readout the charge as separate images for each of the plurality of optical modes, wherein the optical inspection system is configured to generate the separate images by scanning the sample with the illumination; and a controller, wherein the controller is configured to control a length to which the sample light is scanned before switching between the plurality of optical modes, wherein the length to which the sample light is scanned before switching between the plurality of optical modes is based on a pixel length divided by the plurality of optical modes.

19. The optical inspection system of claim 18, wherein the controller is configured to:

cause the multi-mode TDI sensor to sequentially receive the sample light with the plurality of optical modes;

accumulate the charge in the plurality of active pixel rows and transfer the charge between the plurality of active pixel rows and the plurality of inactive pixel rows of the multi-mode TDI sensor as the sample light is sequentially received; and readout the charge via the readout circuit.

20. A method comprising:

causing a multi-mode TDI sensor to sequentially receive a sample light with a plurality of optical modes, wherein the multi-mode TDI sensor comprises a plurality of active pixel rows, wherein the plurality of active pixel rows are configured to accumulate charge based on the sample light received by the plurality of active pixel rows; a plurality of inactive pixel rows, wherein the plurality of inactive pixel rows are configured to buffer the charge without accumulating additional of the charge in response to receiving the sample light, wherein the plurality of active pixel rows and the plurality of inactive pixel rows alternate in a sequence, wherein the sequence defines the plurality of optical modes for which the multi-mode TDI sensor is configured, wherein the charge is configured to transfer between the plurality of active pixel rows and the plurality of inactive pixel rows in the sequence; and a readout circuit, wherein the readout circuit is configured to readout the charge as separate images for each of the plurality of optical modes;

accumulating the charge in the plurality of active pixel rows and transferring the charge between the plurality of active pixel rows and the plurality of inactive pixel rows of the multi-mode TDI sensor as the sample light is sequentially received, wherein a length to which the sample light is scanned before switching between the plurality of optical modes is based on a pixel length divided by the plurality of optical modes; and reading out the charge via the readout circuit.

*  *  *  *  *